(12) United States Patent
Yonezawa et al.

(10) Patent No.: US 10,218,933 B2
(45) Date of Patent: Feb. 26, 2019

(54) CONNECTING STRUCTURE, ELECTRICAL DEVICE AND TELEVISION APPARATUS

(75) Inventors: Hideo Yonezawa, Osaka (JP); Yuki Kita, Osaka (JP); Akihiro Fujikawa, Osaka (JP); Kenji Ogura, Osaka (JP); Tsukasa Fujimoto, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 1322 days.

(21) Appl. No.: 13/547,511

(22) Filed: Jul. 12, 2012

(65) Prior Publication Data
US 2013/0021532 A1 Jan. 24, 2013

(30) Foreign Application Priority Data

Jul. 21, 2011 (JP) ................................. 2011-159739
Jul. 21, 2011 (JP) ................................. 2011-159740
Oct. 11, 2011 (JP) ................................. 2011-224315

(51) Int. Cl.
*H04N 5/64* (2006.01)
*H04N 5/44* (2011.01)
*F16M 13/02* (2006.01)
*F16B 5/02* (2006.01)

(52) U.S. Cl.
CPC .............. *H04N 5/64* (2013.01); *F16M 13/02* (2013.01); *F16B 5/025* (2013.01)

(58) Field of Classification Search
CPC ............ F16M 13/02; H04N 5/64; F16B 5/025
USPC ............... 348/825, 836, 787, 789, 794, 844; 248/222.14, 317, 221.11; 361/679.01, 361/679.02; 312/7.2; 403/21
See application file for complete search history.

(56) References Cited

U.S. PATENT DOCUMENTS

| 3,726,179 | A | 4/1973 | Friese, Jr. |
| 7,988,121 | B2 | 8/2011 | Kameoka |
| 8,672,425 | B2 * | 3/2014 | Yamanaka ............... H04N 5/64 248/220.21 |
| 2008/0277548 | A1 * | 11/2008 | Kameoka ............... F16M 11/04 248/222.14 |

(Continued)

FOREIGN PATENT DOCUMENTS

JP 11-294436 A 10/1999
JP 2001-336518 A 12/2001

(Continued)

OTHER PUBLICATIONS

Extended European Search Report of the corresponding European Application No. 12176996.2, dated Dec. 9, 2014.

*Primary Examiner* — Brian P Yenke
*Assistant Examiner* — Jean W Desir
(74) *Attorney, Agent, or Firm* — Global IP Counselors, LLP

(57) ABSTRACT

An electrical device includes a rear chassis, a fastening member, and an attachment member. The rear chassis has a through-hole. The fastening member is disposed inside the rear chassis. The fastening member has a threaded hole. The attachment member retains the fastening member relative to the rear chassis. The attachment member has a first engaging part that engages with an internal portion of the rear chassis. The screw extends through the through-hole of the rear chassis and screwed into the threaded hole of the fastening member for attaching a wall-mount fixture to an external portion of the rear chassis.

18 Claims, 21 Drawing Sheets

(56) References Cited

U.S. PATENT DOCUMENTS

2010/0320886 A1    12/2010  Sung et al.
2011/0199723 A1*    8/2011  Sato .................. G02F 1/133308
                                                           361/679.01

FOREIGN PATENT DOCUMENTS

| JP | 2003-338692 A | 11/2003 |
| JP | 2005-260184 A | 9/2005 |
| JP | 2007-103270 A | 4/2007 |
| JP | 2008-281024 A | 11/2008 |
| JP | 2009-265223 A | 11/2009 |
| JP | 2010-030516 A | 2/2010 |
| JP | 2010-030516 A | 2/2010 |
| JP | 2011-3295 A | 1/2011 |
| KR | 20110052125 A | 5/2011 |

* cited by examiner

CONNECTING STRUCTURE, ELECTRICAL DEVICE AND TELEVISION APPARATUS

CROSS-REFERENCE TO RELATED APPLICATIONS

This application claims priority to Japanese Patent Application Nos. 2011-59739 filed on Jul. 21, 2011, 2011-159740 filed on Jul. 21, 2011 and 2011-224315 filed on Oct. 11, 2011. The entire disclosures of Japanese Patent Application Nos. 2011-159739, 2011-159740 and 2011-224315 are hereby incorporated herein by reference.

BACKGROUND

Field of the Invention

This invention generally relates to a connecting structure. More specifically, the present invention relates to a connecting structure for an electrical device and a television apparatus.

Background Information

Conventional television apparatuses are known to which a wall-mount fixture can be attached see Japanese Laid-Open Patent Application Publication No. 2009-265223 (Patent Citation 1), for example).

This Patent Citation 1 discloses a television apparatus provided with a display panel (display unit), a rear chassis for housing the display panel, and an inside fixture used to attach a wall-mount fixture. The inside fixture is made of sheet metal and disposed inside the rear chassis. The inside fixture includes a base part having a plurality of through-holes for fixing the inside fixture to aback surface side of the display panel, and a screw stop part having a threaded hole formed by cutting out from the base part. The inside fixture is screwed to the display panel via the plurality of through-holes of the base part in astute in which the threaded hole of the screw stop part is disposed in a position overlapping the through-hole formed in the rear chassis. During attachment of the wall-mount fixture, a screw for fixing the wall-mount fixture is passed from the outside of the rear chassis through the through-hole of the wall-mount fixture and the through-hole of the rear chassis and screwed into the threaded hole of the screw stop part of the inside fixture. By this configuration, the wall-mount fixture is fixed to the rear chassis.

With this Patent Citation 1, the inside fixture is fixed to the back surface of the television apparatus (or a flat-screen display device) by screw fastening. The wall-mount fixture having a hook part is fastened by the screw to the inside fixture.

Another conventional attachment fixture is a sheet-metal member having a flat part with a bottomed cylindrical cavity formed by deep-drawing, and an attachment piece provided in a stepped shape continuous with the flat part. An attachment screw insertion hole and positioning holes on both sides thereof are formed in the attachment piece. The attachment fixture is attached to an attachment seat formed in a back panel (rear panel) of a television receiver so as to protrude inward. Specifically, a threaded hole and positioning projections are provided to the attachment seat provided to the back panel. The positioning holes formed in the attachment piece of the attachment fixture are fitted on the positioning projections. An attachment screw inserted in the attachment screw insertion hole is screwed into the threaded hole. In this attached state, the flat part contacts with a seat surface formed on an inside surface of the back panel. An internal space of the bottomed cylindrical cavity faces a through-hole formed in the back panel. An inside surface of the cavity is formed as a threaded hole.

Conventionally, when a television receiver employs this wall-mounted configuration, a machine screw inserted in the through-hole of the back panel and screwed into the threaded hole of the cavity is used as a machine screw for fixing a wall-mount fitting, used to fix the television receiver to a wall surface, to the back panel. In other words, a machine screw for fastening and fixing a wall-mount fitting provided with a hook part to the back panel specifically corresponds to the machine screw used to fix the television receiver to the wall surface. The television receiver is attached to the wall surface by engaging the hook part of the wall-mount fitting, fixed to the back panel by the machine screw with a mating-side locking member fixed to an indoor wall surface, for example.

A terminal fitting has also been proposed that enables additional lead wire connections to a box-type terminal fitting of an electric instrument (see Japanese Laid-Open Patent Application Publication No. 2009-265223 (Patent Citation 2), for example). A terminal block has also been proposed that can prevent problems in assembly of terminal screws and crimped terminals (see Japanese Laid-Open Patent Application Publication No. 2011-3295 (Patent Citation 3), for example).

SUMMARY

With the conventional attachment fixture, the threaded hole for screwing the machine screw is formed in the bottomed cylindrical cavity formed by deep-drawing.

However, in order for a threaded hole with an adequate screwing depth to be formed in the bottomed cylindrical cavity, it is essential that the cavity have a relatively large axial length in relation to the diameter dimension of the threaded hole. Numerous material and technical difficulties arise from the large draw depth that is required to form a cavity with the required axial length by deep-drawing. Among various problems, as a result of breakage at the drawing site and increased rates of defects in the attachment fixture, the material yield declines. Furthermore, since an expensive sheet-metal member suitable for deep-drawing must be used, and the sheet-metal member must also be of a size that allows material to be made to flow into the deep-drawing site, the size of the attachment fixture itself increases.

On the other hand, the flat part of the attachment fixture can be subjected to a burring process or the like to form a through-hole. A threaded hole can be provided by threading the inside surface of the through-hole. When this method is used, there is no longer a need to form a threaded hole in the bottomed cylindrical cavity formed by deep-drawing, the material and technical difficulties described above are mitigated, and advantages in cost are also gained.

However, when the threaded hole is formed merely by a through-hole created by simple burring, in a case where the user misapplies a machine screw that is longer than the specified dimension for the machine screw, the machine screw protrudes from the threaded hole. When such a misapplication of a machine screw occurs, a distal end part of the machine screw passed through the threaded hole contacts a wiring board, an electrical/electronic component mounted thereto, or other energized part positioned in the vicinity of the location at which the attachment fixture is attached. This leads to unexpected malfunctioning or an accident.

In order to prevent such an occurrence, a bottom wall part is provided by deep-drawing integrally with the cavity in which the threaded hole is formed, and the cavity is formed cylindrically so as to have a bottom. Through this configuration, even when a long machine screw is misapplied, the distal end part of the machine screw is stopped by the bottom wall part, and the machine screw is therefore prevented from protruding from the threaded hole and contacting energized parts. Therefore, although the threaded hole of the attachment fixture is disadvantageous in terms of material, technique, cost, and other aspects, the threaded hole had to be formed in the deep-drawn cavity.

Furthermore, in the conventional television apparatus described in Patent Citation 1, the inside fixture must be screwed to the back surface side of the display panel at a plurality of locations. Thus, the assembly process is made inconvenient by the need to tighten a plurality of screws in order to fix the inside fixture. Therefore, in the technique of Patent Citation 1, the problem arises that multiple screw tightening steps must be added in the case that structure for attaching a wall-mount fixture is provided, and the working efficiency of apparatus assembly is reduced.

An improved connecting structure, an electrical device and a television apparatus were conceived in light of the above-mentioned problem. One object of the present disclosure is to provide an electrical device and television apparatus capable of preventing a reduction in the working efficiency of apparatus assembly in the case that a structure for attaching a wall-mount fixture is provided.

Another object of the present disclosure is to provide a connecting structure having a simple structure.

In accordance with one aspect of the present disclosure, an electrical device includes a rear chassis, a fastening member, and an attachment member. The rear chassis has a through-hole. The fastening member is disposed inside the rear chassis. The fastening member has a threaded hole. The attachment member retains the fastening member relative to the rear chassis. The attachment member has a first engaging part that engages with an internal portion of the rear chassis. The screw extends through the through-hole of the rear chassis and screwed into the threaded hole of the fastening member for attaching a wall-mount fixture to an external portion of the rear chassis.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

A liquid crystal television apparatus 100 according to a first embodiment will be described with reference to FIGS. 1 through 10. The liquid crystal television apparatus 100 is an example of an "electrical device" and a "television apparatus" of the present disclosure.

Figure 1:
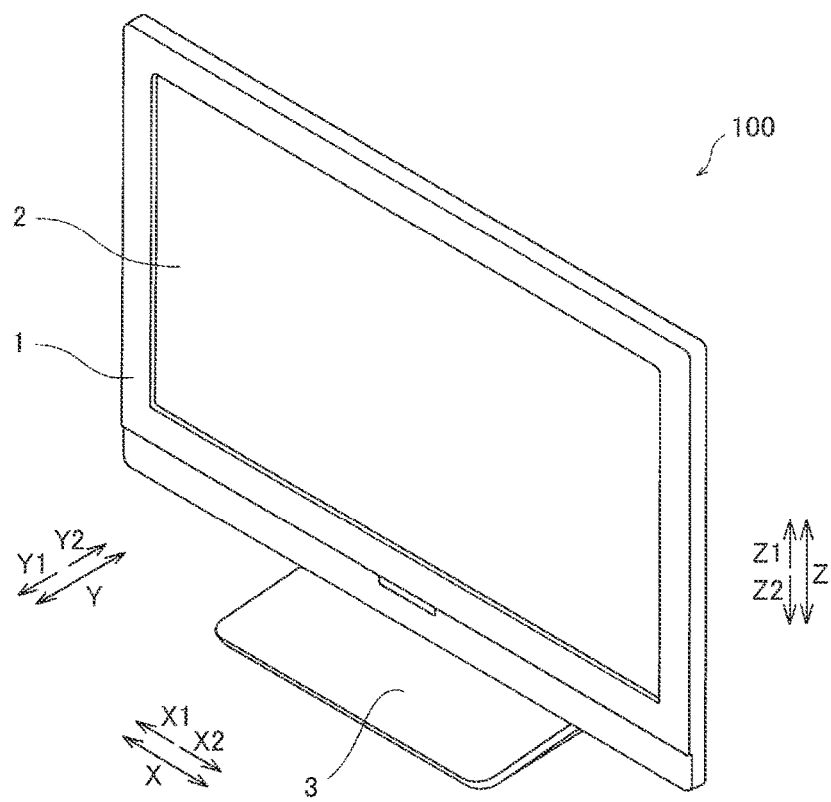
FIG. 1 is a front perspective view of a liquid crystal television apparatus in accordance with a first embodiment of the present disclosure.
Figure 2:
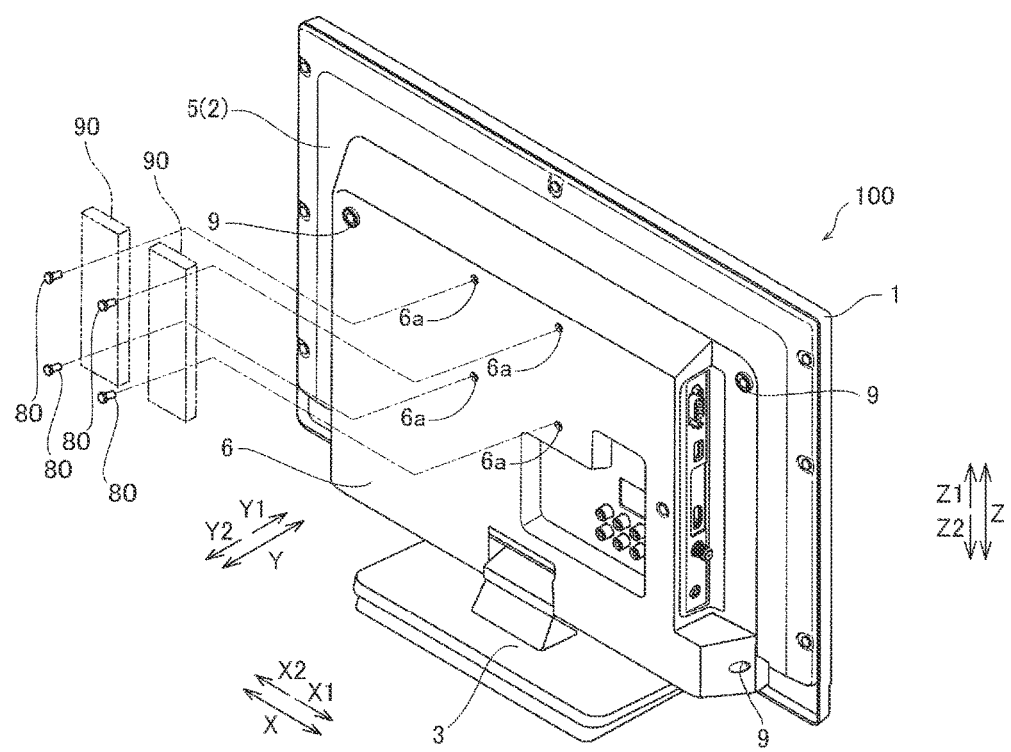
FIG. 2 is a rear perspective view of the liquid crystal television apparatus illustrated FIG. 1.

As shown in FIGS. 1 and 2, the liquid crystal television apparatus 100 has a frame-shaped front chassis 1, a liquid crystal module 2, and a stand member 3. The front chassis 1 has a rectangular shape. The liquid crystal module 2 is housed in the front chassis 1. The stand member 3 supports the liquid crystal television apparatus 100 as a whole. The stand member 3 is detachably provided to the liquid crystal television apparatus 100. The liquid crystal module 2 is an example of a "display unit" of the present disclosure. The front chassis 1 and the stand member 3 are both made of resin.

Figure 3:
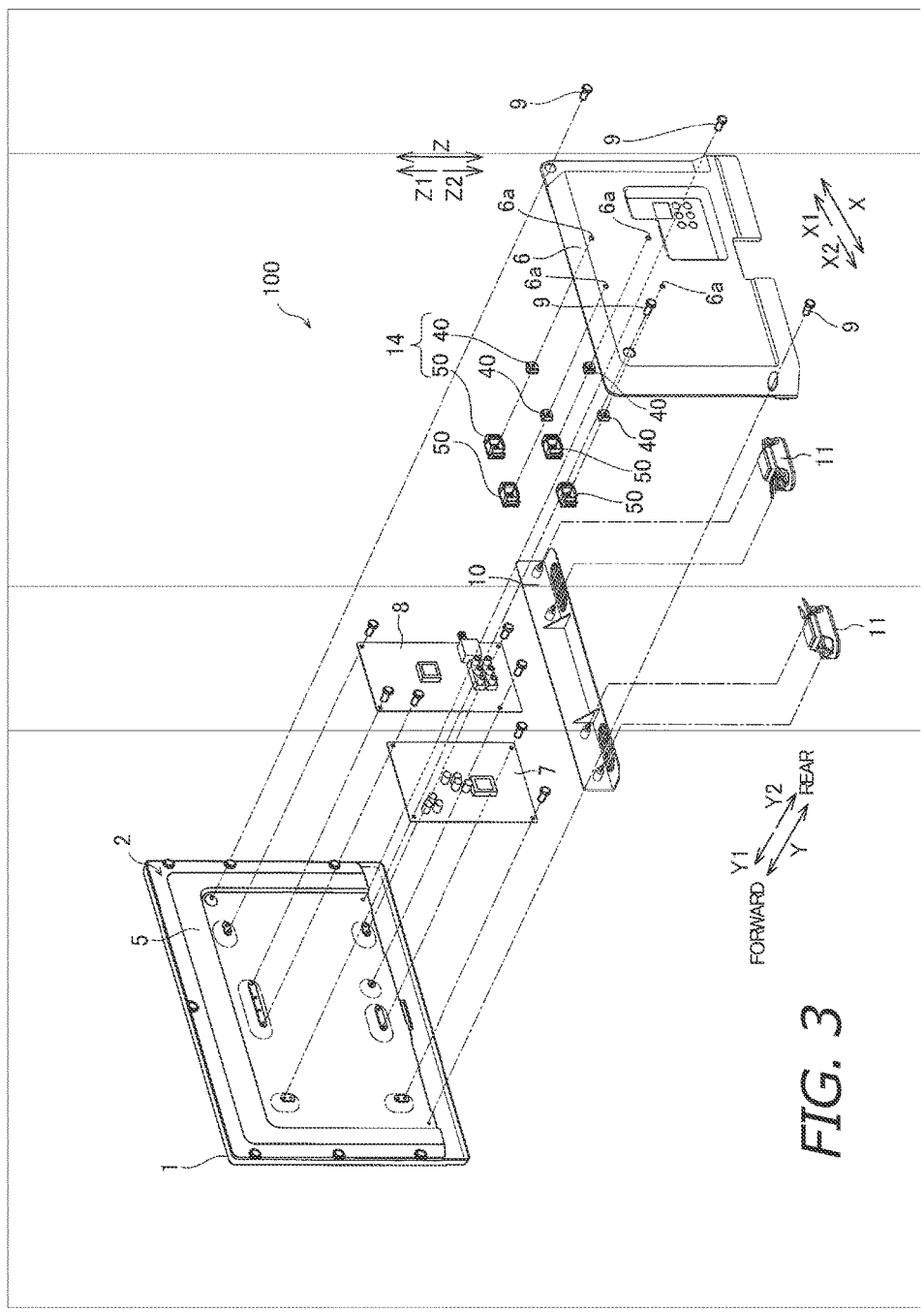
FIG. 3 is an exploded perspective view of the liquid crystal television apparatus illustrated FIG. 1.

As shown in FIGS. 2 and 3, a metal or sheet metal rear frame 5 formed smaller than the front chassis 1 and having a rectangular shape is disposed behind the front chassis 1 (on the arrow Y2 side). A rear cover 6 made of resin is attached on a back side of the rear frame 5. The rear cover 6 has a rectangular shape as viewed from the rear, and is formed smaller than the front chassis 1 and the rear frame 5. The rear cover 6 is an example of a "rear chassis" of the present disclosure.

Four through-holes 6a in a square arrangement are formed in the rear cover 6. Screws 80 for fixing a wall-mount fixture or fitting 90 are inserted in the through holes 6a. Specifically, the wall-mount fixture 90 can be attached to an external surface of the rear cover 6 by inserting the screws 80 in the through-holes 6a via through-holes (not shown) in the wall-mount fixture 90 and screwing the screws 80 into fastening members 40 (see FIG. 5) of fixing parts 14 (see FIG. 5) provided inside the rear cover 6. The liquid crystal television apparatus 100 can be used in a wall-mounted configuration by attaching the wall-mount fixture 90 to the rear cover 6 and fixing the wall-mount fixture 90 to an installation fitting (not shown) attached to an indoor wall (e.g., a wall surface), ceiling, or the like, for example. The stand member 3 is removed when the liquid crystal television apparatus 100 is used in the wall-mounted configuration. The liquid crystal television apparatus 100 of the first embodiment is thus configured to be usable both as installed using the stand member 3 and as wall-mounted using the wall-mount fixture 90. The screws 80 and the fastening members 40 form a "connecting structure" or a "connecting device" of the present disclosure.

As shown in FIG. 3, a circuit board 8 for signal processing and a circuit board 7 having the function of supplying power to the apparatus as a whole are attached to a rear surface (surface on the arrow Y2 side) of the rear frame 5 in an arrangement spaced apart from each other a predetermined distance in the X direction. A speaker attachment member 10 to which two speakers 11 are attached is also attached to the rear surface of the rear frame 5. The rear cover 6 is attached to the rear surface of the rear frame 5 by four screws 9 so as to cover the circuit board 7, the circuit board 8, and the speaker attachment member 10 from behind.

Figure 4:
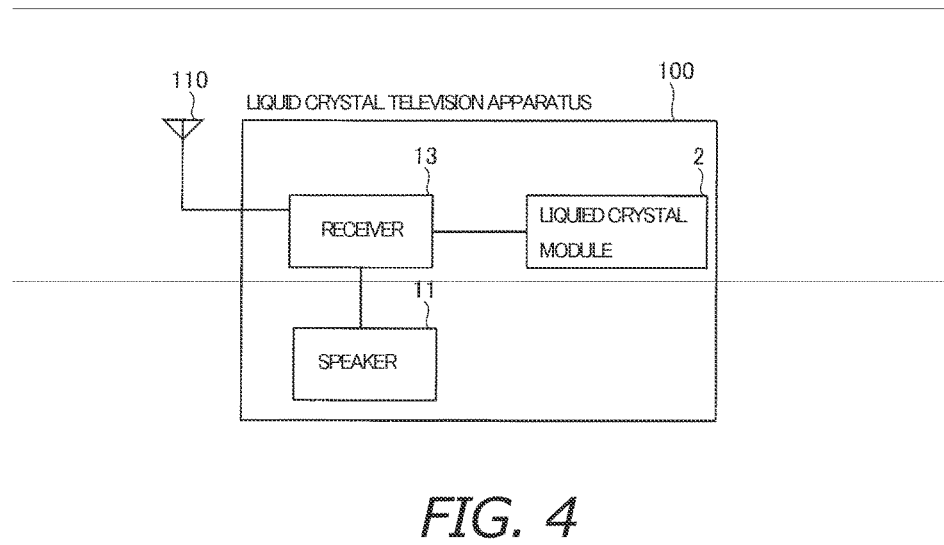
FIG. 4 is a block diagram of the liquid crystal television apparatus illustrated in FIG. 1.

As shown in FIG. 4, the signal processing circuit board 8 attached to the rear frame 5 has a receiver (tuner) 13 capable of receiving a television broadcast. The receiver 13 is connected to the liquid crystal module 2 and the speakers 11, and is configured so as to output to the liquid crystal module 2 a video signal from the television broadcast signal (video signal and audio signal) received by an antenna 110 to cause the television broadcast to be displayed, and to output an audio signal to the speakers 11.

Figure 5:
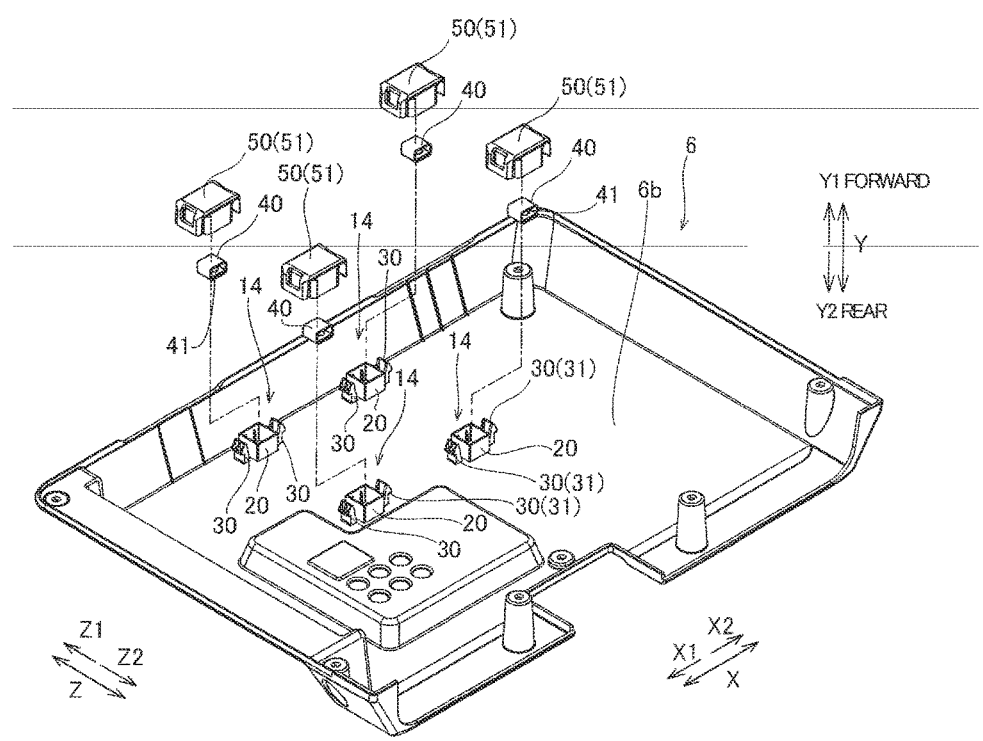
FIG. 5 is a perspective view showing the inside of a rear cover of the liquid crystal television apparatus illustrated in FIG. 1.
Figure 6:
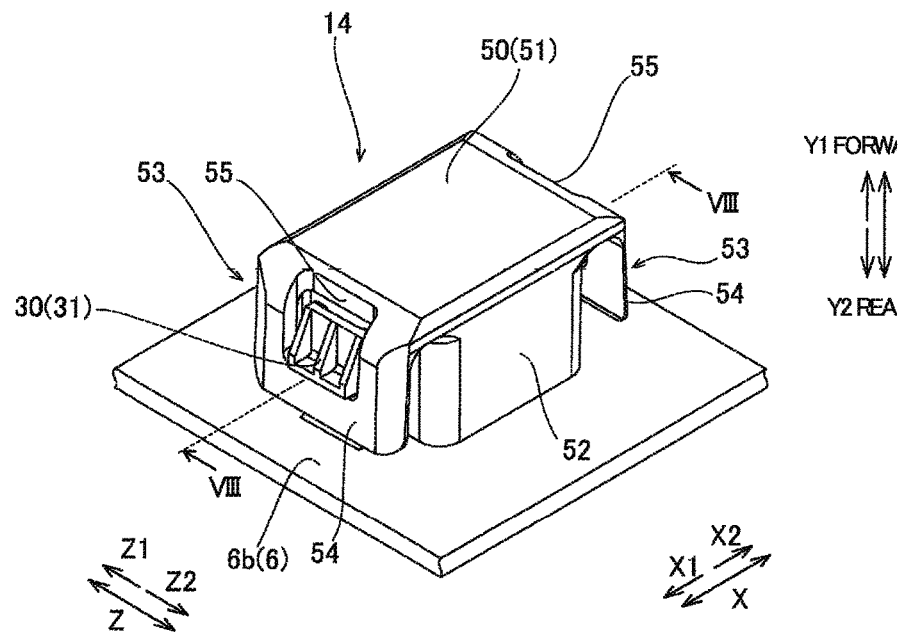
FIG. 6 is a perspective view showing a fixing part of the liquid crystal television apparatus illustrated in FIG. 1.

As shown in FIGS. 3, 5, and 6, the liquid crystal television apparatus 100 in the first embodiment is provided with four fixing parts 14 for fixing the screws 80 used to attach the wall-mount fixture 90 (see FIG. 2) described above. The four fixing parts 14 are provided in positions corresponding to the four through-holes 6a (see FIG. 2).

The four fixing parts 14 each have the same structure. As shown in FIG. 5, the fixing parts 14 each have a frame-shaped wall part 20, a pair of engaging parts 30, a fastening member 40, and a cap 50 (e.g., an attachment member or a cap shaped portion). The frame-shaped wall part 20 and the engaging parts 30 are formed in a position corresponding to respective one of the through-hole 6a. The fastening member 40 has a threaded hole 41. The cap 50 retains the fastening member 40 within the internal surface 6b of the rear cover 6. Consequently, the frame-shaped wall parts 20, the engaging parts 30, the fastening members 40 and the caps 50 are each provided corresponding to the four through-holes 6a. The engaging parts 30 are examples of "second engaging part" of the present disclosure. The caps 50 are examples of "attachment member" of the present disclosure. The configuration of the fixing parts 14 will next be described in detail.

Figure 7:
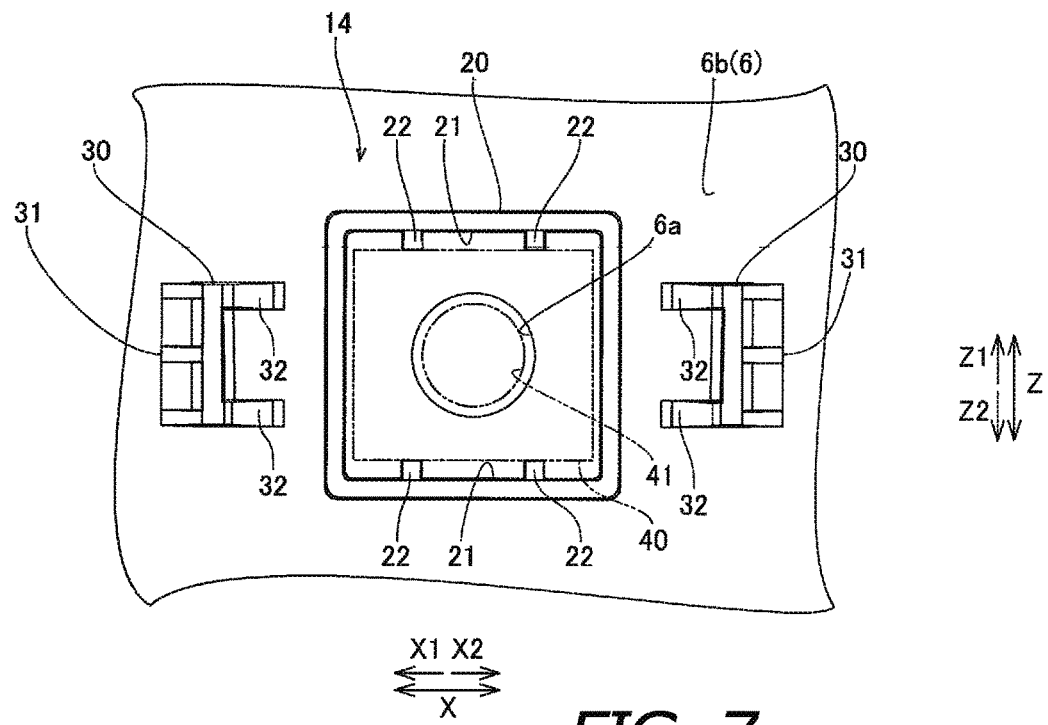
FIG. 7 is a plan view showing an internal surface of the rear cover of the liquid crystal television apparatus illustrated in FIG. 1.

As shown in FIG. 7, the frame-shaped wall part 20 is substantially square-shaped and surrounds the periphery of the through-hole 6a in plan view, and is formed so as to extend forward (in the Y1 direction in FIG. 5; toward the inside of the rear cover 6) from an internal surface 6b (e.g., internal portion) of the rear cover 6. Two pairs of rib-shaped positioning parts 22 extending toward each other are formed integrally with a pair of inside surfaces 21 facing each other in the up-down direction (Z direction) of the rectangular frame-shaped wall part 20. The positioning parts 22 are configured to align the positions of the threaded hole 41 of the fastening member 40 and the through-hole 6a of the rear cover 6 in the Z direction by making contact with the fastening member 40 on either side thereof from the top and bottom.

Figure 8:
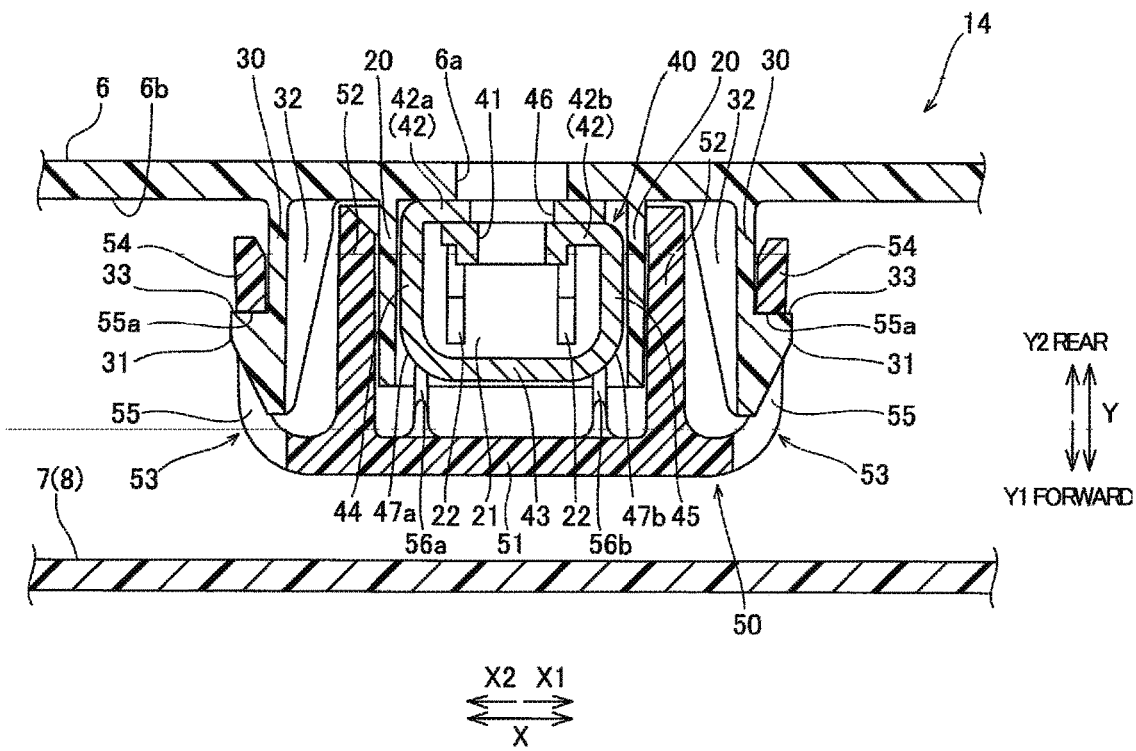
FIG. 8 is a cross sectional view taken along VIII-VIII line in FIG. 6.

The engaging parts 30 are provided (as a pair thereof) on both sides (in the X direction) outside the frame-shaped wall part 20. The pair of engaging parts 30 is formed so that each engaging part extends forward (in the Y1 direction of FIG. 5) from the internal surface of the rear cover 6. As shown in FIG. 8, each of the engaging parts 30 in the pair thereof has a hook part 31 formed so as to protrude outward in the X direction in relation to the through-hole 6a, and a reinforcing rib 32 formed on the opposite side thereof (inside in the X direction) from the hook part 31. Each hook part 31 has an engaging surface 33 substantially parallel to the internal surface 6b of the rear cover 6. Each hook part 31 is provided so as to engage, at the engaging surface 33, with an engaging hole 55 (described below) of the cap 50 in the Y direction orthogonal to the internal surface 6b of the rear cover 6. The reinforcing ribs 32 are formed on both sides of each of the engaging parts 30 in the Z direction, extend toward the through-hole 6a, and are formed so as to increase in thickness progressively toward the internal surface 6b of the rear cover 6.

Figure 9:
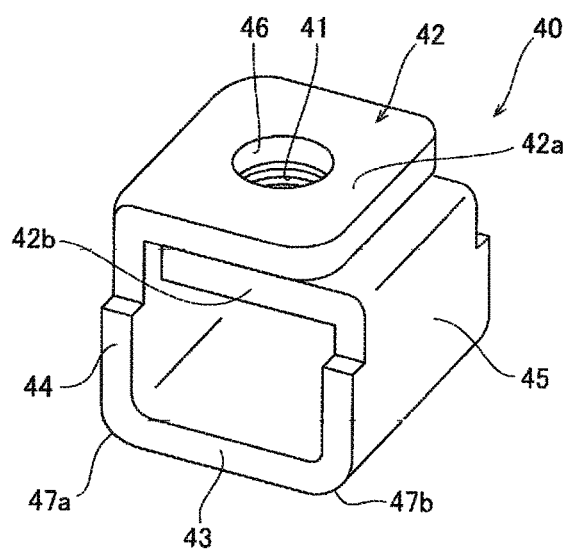
FIG. 9 is a perspective view of a fastening member of the liquid crystal television apparatus illustrated in FIG. 1.

As shown in FIG. 9, the fastening member 40 is integrally formed as a one-piece, unitary member by folding a band-shaped piece of sheet metal to form a substantially rectangular ring shape with a hollow cross section. The fastening member 40 includes an overlapping part 42, a facing part or receiving part 43, a side surface part or second side plate 44, and a side surface part or first side plate 45. The overlapping part 42 is formed by the end parts (an outside end part or second end plate 42a and an inside end part or first end plate 42b) of the folded band-shaped sheet metal piece that overlap each other. The facing part 43 faces with the overlapping part 42. The side surface part 44 forms a connection between an end portion (e.g., a second end portion) of the facing part 43 and the outside end part 42a of the overlapping part 42. The side surface part 45 forms a connection between an end portion (e.g., a first end portion) of the facing part 43 and the inside end part 42b of the overlapping part 42. The facing part 43 is an example of a "(screw) receiving part" of the present disclosure, which receives a distal end of the screw 80 such that the screw is prevented from being screwed beyond the receiving part. The side surface part 44 and the outside end part 42a form a second bent part of the present disclosure together with an inclined part or second folded portion 47a that is disposed between the end portion of the facing part 43 and the outside end part 42a. The side surface part 45 and the inside end part 42b form a first bent part of the present disclosure together with an inclined part or first folded portion 47b that is disposed between the end portion of the facing part 43 and the inside end part 42b.

The threaded hole 41 is formed in the inside end part 42b of the overlapping part 42, and a through-hole 46 is formed in the outside end part 42a of the overlapping part 42 concentric with the threaded hole 41. The through-hole 46 has an inside diameter slightly larger than the threaded hole diameter of the threaded hole 41. The overlapping part 42 is passed through by the through-hole 46 of the outside end part 42a and the threaded hole 41 of the inside end part 421).

The facing part 43 faces the overlapping part 42 (inside end part 42b) across a gap equal to the height of the side surface part 45. The facing part 43 is configured so as to be capable of stopping the distal end of a screw.

The side surface parts 44 and 45 are each wall shaped and formed so as to stand upright from the facing part 43. A pair of inclined parts 47a and 47b inclined in an arc shape by bending the sheet metal is formed at a corner between the side surface part 44 and the facing part 43 and at a corner between the side surface part 45 and the facing part 43. As shown in FIG. 9, the inclined parts 47a and 47b are inclined so that the gap therebetween increases progressively toward the internal surface 6b of the rear cover 6.

As shown in FIGS. 6 and 8, the cap 50 includes, formed integrally with each other, a substantially rectangular lid part 51 which faces the internal surface 6b of the rear cover 6, a side wall part 52 which extends toward the internal surface 6b of the rear cover 6 from a peripheral edge of the lid part 51, and a pair of engaging parts 53 (outwardly) extending to the outside of the side wall part 52 from the peripheral edge of the lid part 51. The cap 50 is formed of an electrically insulating resin material. The cap 50 is configured so as to be capable of attaching to and detaching from the rear cover 6 by engaging the pair of engaging parts 53 with the pair of engaging parts 30 of the rear cover 6, and performs a retaining function to ensure that the fastening member 40 fitted in the frame-shaped wall part 20 does not drop out.

The side wall part 52 of the cap 50 has a substantially square shape corresponding to the frame-shaped wall part 20 in plan view, and is formed so that the side wall part 52 can fit on the external periphery of the frame-shaped wall part 20. The side wall part 52 is provided so as to cover the area around the fastening member 40 and fittedly surround the frame-shaped wall part 20 of the rear cover 6. The cap 50 is formed in a cap shape in which the fastening member 40 on the internal surface 6b side of the rear cover 6 is covered by the side wall part 52 and the lid part 51 which covers the side wall part 52.

The engaging parts 53 are provided (as a pair thereof) on both sides (in the X direction) outside the side wall part 52 and formed so as to extend toward the internal surface 6b of the rear cover 6 from the lid part 51. The engaging parts 53 include annular arm parts 54 in which engaging holes 55 with through-holes are formed. The hook parts 31 of the engaging parts 30 of the rear cover 6 are inserted into the engaging holes 55, and the engaging surfaces 33 of the hook parts 31 and end surfaces 55a (inside surfaces of the arm parts 54) of the engaging holes 55 thereby engage with each other. In the first embodiment, a configuration is adopted in which the engaging holes 55 of the engaging parts 53 engage from the outsides of the hook parts 31 of the engaging parts 30 of the rear cover 6. The engaging parts 53 are not provided with reinforcing ribs or the like, and the engaging parts 53 are formed so as to flex more easily than the engaging parts 30 of the rear cover 6. The engaging holes 55 are examples of an "engaging concavity" of the present disclosure.

Figure 10:
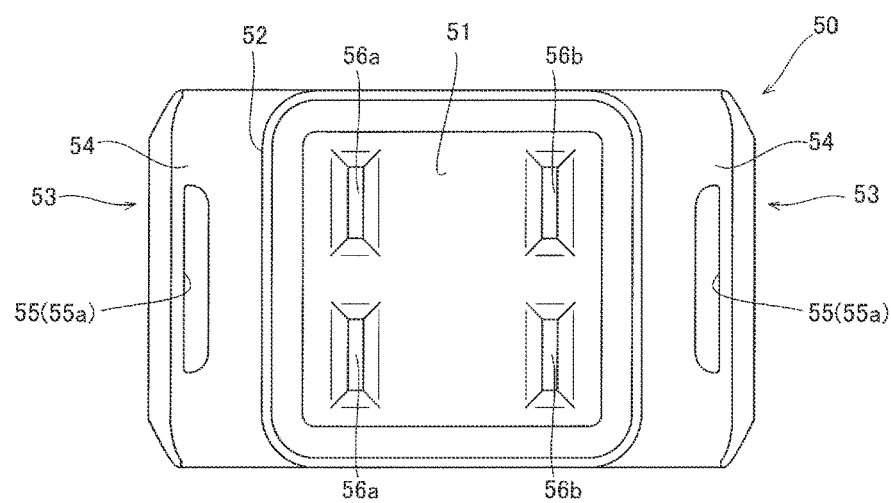
FIG. 10 is a bottom plan view of a cap of the liquid crystal television apparatus illustrated in FIG. 1.

As shown in FIGS. 8 and 10, a pair of flexurally deformable protrusions 56a (e.g., deformable protrusions or additional deformable protrusions) and a pair of flexurally deformable protrusions 56b (e.g., deformable protrusions or additional deformable protrusions) formed integrally with the lid part 51 are formed on an internal surface of the lid part 51 of the cap 50. The protrusions 56a and 56b are disposed between the lid part 51 and the fastening member 40 and configured so as to make contact with the fastening member 40 and flexurally deform when the cap 50 is attached to the rear cover 6. The four protrusions 56a and 56b thereby function to urge the fastening member 40 against the internal surface 6b of the rear cover 6. The protrusions 56a and 56b are examples of an "urging part" of the present disclosure.

The protrusions 56a and 56b are provided two at a time (in pairs) on both sides in the X direction, and each pair thereof is aligned in the Z direction. The two protrusions 56a on the X2 side are disposed so as to make contact with the inclined part 47a of the fastening member 40, and the two protrusions 56b on the X1 side are disposed so as to make contact with the inclined part 47b of the fastening member 40. The fastening member 40 is therefore urged in the X1 direction by the protrusions 56a at the inclined part 47a, and urged in the X2 direction by the protrusions 56b at the inclined part 47b.

Through a configuration such as described above, the liquid crystal television apparatus 100 according to the first embodiment is configured so that a screw 80 for attaching a wall-mount fixture 90 (see FIG. 2) to the rear cover 6 is screwed from outside the rear cover 6 into the threaded hole 41 in the fastening member 40 via the through-hole 6a. In other words, the screw 80 extends through the through-hole 6a, the through-hole 46 and is screwed into the threaded hole

41. The fastening member 40 is retained by the cap 50. The wall-mount fixture 90 can thereby be attached to an external surface (e.g., external portion) of the rear cover 6.

Attachment of the cap 50 will next be described with reference to FIGS. 5 and 8.

In the first embodiment, the caps 50 can be attached merely by pushing the caps 50 toward the internal surface 6b from inside the rear cover 6, as shown in FIGS. 5 and 8.

More specifically, the fastening member 40 is first set in the frame-shaped wall part 20 so that the threaded hole 41 faces the through-hole 6a of the rear cover 6. At this time, the fastening member 40 is positioned in the Z direction by the positioning parts 22 of the frame-shaped wall part 20. The cap 50 is then moved toward the internal surface 6b of the rear cover 6 so that the side wall part 52 of the cap 50 fits onto the external periphery of the frame-shaped wall part 20. At this time, the annular arm parts 54 of the engaging parts 53 flex and deform so as to run over the outsides (outsides in the X direction) of the hook parts 31 of the engaging parts 30, as shown in FIG. 8. Meanwhile, since the engaging parts 30 are provided with the reinforcing ribs 32, there is almost no deformation of the engaging parts 30. When the arm parts 54 surmount the hook parts 31 of the engaging parts 30, the flexure of the arm parts 54 is released and the arm parts 54 restore inward (inward in the X direction), and the hook parts 31 are thereby fitted in the engaging holes 55. The end surfaces 55a of the engaging holes 55 and the engaging surfaces 33 of the hook parts 31 thereby make contact with each other in the Y direction. The engaging parts 53 of the cap 50 and the engaging parts 30 of the rear cover 6 are engaged with each other. The cap 50 is fixed to the rear cover 6.

Screw receiving by the fastening member 40 and prevention of deformation of the fastening member 40 will next be described with reference to FIG. 11. For convenience, the cap 50 and frame-shaped wall part 20 are omitted and a schematic representation is shown in FIG. 11.

Figure 11:
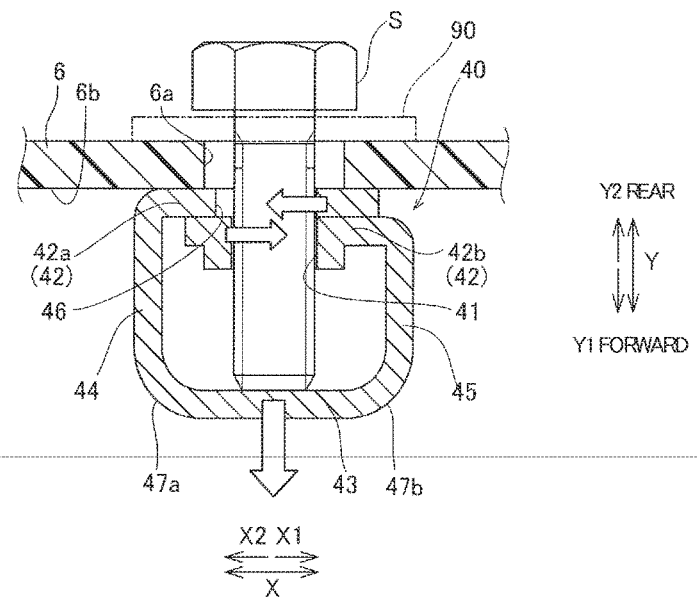
FIG. 11 is a schematic diagram showing a function of the fastening member of the liquid crystal television apparatus illustrated in FIG. 1.

As shown in FIG. 11, in such cases as when a screw S having a long axial length is used by mistake to attach the wall-mount fixture 90, there is a risk of the screw S being screwed in too far. In this case, in the first embodiment, the screw tip passed through the through-hole 6a and threaded hole 41 of the overlapping part 42 can be stopped by making contact with the facing part 43 and prevented from screwing in any further.

When the screw S is screwed in further in this state, the outside end part 42a and the inside end part 42b of the overlapping part 42 are pulled apart by the pressure exerted on the facing part 43. In this case as well, since the screw S is inserted in both the through-hole 6a of the outside end part 42a and the threaded hole 41 of the inside end part 42b, the screw S itself functions as a linchpin or wedge for fixing the outside end part 42a and the inside end part 42b. Thus, deformation that causes the outside end part 42a and inside end part 42b to open is prevented from occurring.

The effects for suppressing dropout of the caps 50 will next be described with reference to FIG. 12.

Figure 12:
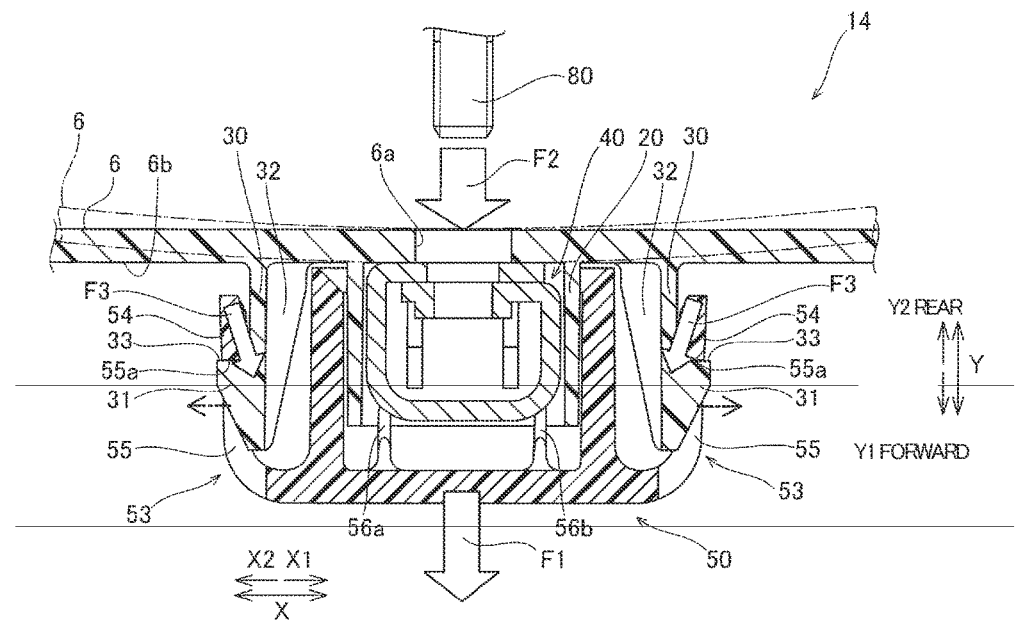
FIG. 12 is a cross sectional view showing an external force exerted during attachment of a wall-mount fixture in the liquid crystal television apparatus illustrated in FIG. 1.

As shown in FIG. 12, during attachment of the wall-mount fixture 90, an external force F1 exerted by the screw 80 in the inside (Y1 direction; forward) direction is applied to the cap 50 via the fastening member 40. An external force F2 exerted by a worker in the inside (Y1 direction; forward) direction may also be applied to a peripheral edge of the through-hole 6a of the rear cover 6.

At this time, a lifting force F3, created by the external force F1, acts on each of the pair of engaging parts 53 of the cap 50 in a direction inclined toward the inside in the X direction with the through-hole 6a at the center thereof. In the first embodiment, since the engaging parts 53 (engaging holes 55) of the cap 50 are engaged with the engaging parts 30 (hook parts 31) of the rear cover 6 from the outside in the X direction, the force F3 exerted during attachment of the wall-mount fixture 90 acts to more securely engage the engaging parts 53 and the engaging parts 30. Since the engaging parts 30 of the rear cover 6 are reinforced by the reinforcing ribs 32 and do not readily flex, the engaging parts 30 of the rear cover 6 are kept from flexing and disengaging even when the force F3 occurs.

When the external force F2 is applied to the peripheral edge of the through-hole 6a of the rear cover 6, the rear cover 6 may curve slightly inward about the through-hole 6a, as indicated by the dashed line. In this case as well, the pair of engaging parts 30 of the rear cover 6 is each displaced outward in the X direction, and the curving of the rear cover 6 acts to more securely engage the engaging parts 53 and the engaging parts 30.

As a result of the effects described above, even the simple attachment structure for engaging the cap 50 with the rear cover 6 in the first embodiment is capable of preventing the cap 50 and the fastening member 40 from dropping out during attachment of the wall-mount fixture 90.

Figure 13:
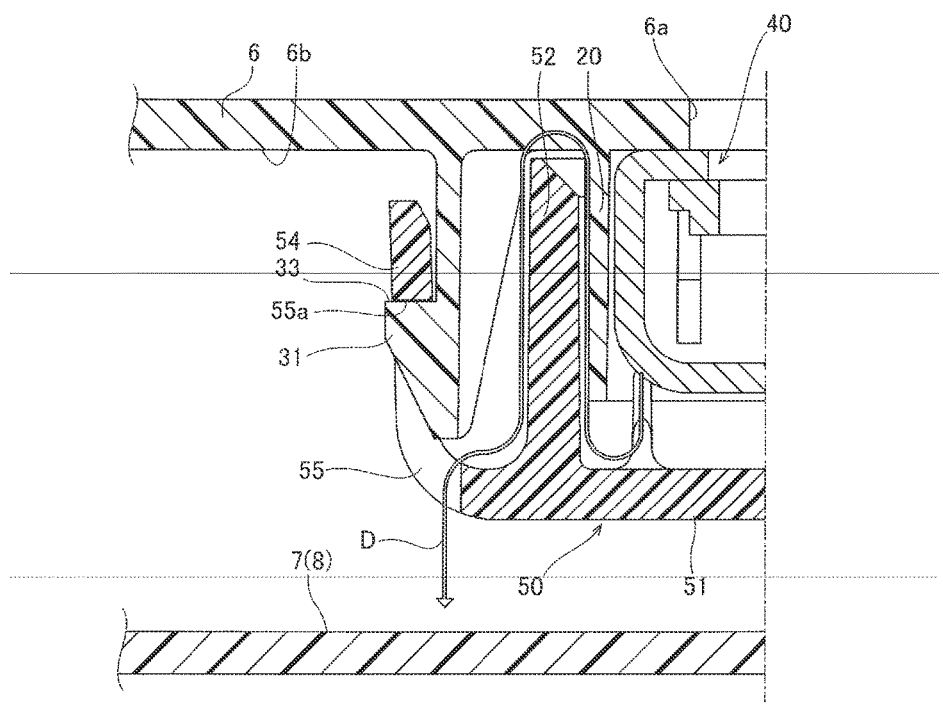
FIG. 13 is an enlarged sectional view showing a path of static electricity in the fixing part of the liquid crystal television apparatus illustrated in FIG. 1.

Suppression of static electricity entry by the cap 50 will next be descried with reference to FIG. 13.

As shown in FIG. 13, since the metal fastening member 40 is retained on the inside of the through-hole 6a of the rear cover 6, it is possible for the fastening member 40 to become charged by static electricity penetrating from outside via the through-hole 6a. In the first embodiment, since the fastening member 40 is covered by the electrically insulating resin cap 50 on the internal surface 6b side of the rear cover 6, static electricity is blocked by the cap 50. It is therefore possible to suppress the effect of static electricity on the circuit board 7 and circuit board 8 inside the rear cover 6. The spatial distance D between the fastening member 40 charged with static electricity and the circuit board 7 or 8 corresponds to the total distance of the path to the circuit board 7 or 8 passing the frame-shaped wall part 20 of the rear cover 6, the side wall part 52 of the cap 50 in which the frame-shaped wall part 20 is fitted, and the end part of the side wall part 52 on the internal surface 6b side of the rear cover 6. The effects of static electricity on the circuit board 7 or 8 are therefore more effectively suppressed as a result of the large spatial distance D.

In the first embodiment, the fastening member 40 having the threaded hole 41, and the cap 50 having the engaging parts 53 for engaging with the internal surface 6b of the rear cover 6 to retain the fastening member 40 are provided. The screw 80 for attaching the wall-mount fixture 90 to the rear cover 6 is screwed from outside the rear cover 6 into the threaded hole 41 in the fastening member 40 via the through-hole 6a. The fastening member 40 is retained by the cap 50. The wall-mount fixture 90 can thereby be attached to an external surface of the rear cover 6, as described above. The fastening member 40 can thereby be attached to the rear cover 6 merely by engaging the engaging parts 53 of the cap 50 with the internal surface 6b of the rear cover 6. A reduction in the working efficiency of assembly of the liquid crystal television apparatus 100 can thereby be prevented even in the case that a structure (fixing parts 14) for attaching the wall-mount fixture 90 is provided.

In the first embodiment, as described above, the engaging parts 30 for engaging with the engaging parts 53 of the cap 50 is provided on the internal surface 6b of the rear cover 6. Through this configuration, the cap 50 can easily be attached to the internal surface 6*b* of the rear cover 6 merely by engaging the engaging parts 53 of the cap 50 and the engaging parts 30 on the internal surface 6*b* of the rear cover 6 with each other. Thus, a reduction in the working efficiency of assembly of the liquid crystal television apparatus 100 can easily be prevented.

In the first embodiment, as described above, the positioning parts 22 for aligning the positions of the threaded hole 41 of the fastening member 40 and the through-hole 6*a* of the rear cover 6 are provided on the internal surface 6*b* of the rear cover 6. Through this configuration, the positions of the fastening member 40 and the through-hole 6*a* in the rear cover 6 can be precisely aligned even in a simple structure in which the cap 50 is engaged with the rear cover 6 to retain the fastening member 40.

In the first embodiment, as described above, the frame-shaped wall part 20 which has the positioning parts 22 and surrounds the external periphery of the fastening member 40 is provided on the internal surface 6*b* of the rear cover 6. Through this configuration, the fastening member 40 can be retained on the rear cover 6 side as well by the frame-shaped wall part 20. Since the mechanical strength of the positioning parts 22 can be enhanced by the frame-shaped wall part 20, misalignment of the fastening member 40 can be suppressed even in such cases as when the fastening member 40 is subjected to external forces due to screw tightening or other operations during attachment of the wall-mount fixture 90.

In the first embodiment, as described above, the side wall part 52 which surrounds the frame-shaped wall part 20 and is capable of fitting with the frame-shaped wall part 20 is formed in the cap 50. Through this configuration, attachment of the cap 50 to the rear cover 6 can be strengthened by the fitting of the side wall part 52 of the cap 50 onto the external periphery of the frame-shaped wall part 20 of the rear cover 6. Therefore, despite the fact that the structure allows the cap 50 to easily be engaged with the rear cover 6, the cap 50 does not readily detach, and the fastening member 40 can therefore be more reliably retained.

In the first embodiment, as described above, the fastening member 40 is provided with a facing part 43 capable of stopping a distal end of the screw 80. Through this configuration, the distal end of the screw 80 can be stopped by the facing part 43 of the fastening member 40 when the wall-mount fixture 90 is mounted in such cases as when the screw 80 for attaching the wall-mount fixture 90 is screwed in too far or a long screw S (see FIG. 11) is used. The work of attaching the wall-mount fixture 90 to the electrical device is usually performed by the user, in which case the screw 80 may be screwed in too far when the user mistakenly uses an excessively long screw. Even in such a case, it is possible to prevent the distal end of the screw 80 (S) for attaching the wall-mount fixture 90 from protruding into the rear cover 6, and to prevent the cap 50 from dropping out or the screw 80 (S) from contacting an internal circuit board 7, 8 or the like.

In the first embodiment, as described above, the fastening member 40 is formed so as to include the overlapping part 42 formed by folding a sheet-shaped metal member and superposing both ends thereof on each other, and the facing part 43 facing the overlapping part 42. The threaded hole 41 of the fastening member 40 is provided so as to pass through the overlapping part 42, and the facing part 43 configured to be capable of receiving the screw. Through this configuration, the wall-mount fixture attaching screw 80 (S) screwed into the threaded hole 41 of the overlapping part 42 can be made to function as a linchpin for connecting the ends (overlapping part 42) of the sheet-shaped fastening member 40. In this case, when the distal end of the screw 80 (S) that is screwed in too far presses on the facing screw receiving part of the facing part 43, the ends (overlapping part 42) of the fastening member 40 are pulled in the direction of coming apart from each other, and the pressure of the distal end of the screw 80 (S) acts on the screw 80 (S) itself at the overlapping part 42. As a result, since the screw 80 (S) becomes difficult to turn when screwed in too far, the screw 80 (S) is prevented from screwing in too far. Deformation of the fastening member 40 is also suppressed by the connection formed by the overlapping part 42.

In the first embodiment, as described above, the protrusions 56*a* and 56*b* for urging the fastening member 40 toward the internal surface 6*b* of the rear cover 6 are formed in the cap 50. Through this configuration, the fastening member 40 is retained in a state of being pressed toward the internal surface 6*b* of the rear cover 6 by the protrusions 56*a* and 56*b* even when the wall-mount fixture 90 is not attached (the fastening member 40 is not secured by a screw). Minute gaps that cause the fastening member 40 to rattle are thereby prevented from forming. Therefore, even in the case that the electrical device is provided with speakers 11 or other vibration sources, the fastening member 40 can be prevented from making a so-called buzzing noise from the sound pressure (vibration) of the speakers 11.

In the first embodiment, as described above, the protrusions 56*a* and 56*b* are configured so as to be flexurally deformable and disposed between the cap 50 and the fastening member 40, and are formed integrally with the cap 50. Through this configuration, the fastening member 40 can easily be urged by the protrusions 56*a* and 56*b* between the cap 50 and the fastening member 40, merely by causing the fastening member 40 to be retained by attaching the cap 50 to the rear cover 6.

In the first embodiment, as described above, the pair of inclined parts 47*a* and 47*b* inclined on that a gap therebetween enlarges toward the internal surface 6*b* of the rear cover 6 is formed in the fastening member 40. The pair of the flexurally deformable protrusions 56*a* and 56*b* is provided so as to make respective contact with the pair of inclined parts 47*a* and 47*b*. Through this configuration, not only can the protrusions 56*a* and 56*b* urge the fastening member 40 toward the internal surface 6*b* of the rear cover 5, but the protrusions 56*a* and 56*b* can also exert a force toward the space between the pair of inclined parts 47*a* and 47*b*. Thus, it is possible to restrict misalignment of the fastening member 40 in the X direction along the internal surface 6*b* of the rear cover 6.

In the first embodiment, as described above, the fastening member 40 made of metal is covered by the cap 50 formed of an electrically insulating resin material. Through this configuration, the fastening member 40 is covered by the electrically insulating cap 50 while a metal fastening member is used. Thus, even when the fastening member becomes charged by static electricity penetrating through the through-hole 6*a* of the rear cover 6, the static electricity that penetrates via the through-hole 6*a* of the rear cover 6 is blocked by the cap 50 so as to be prevented from affecting the circuit boards 7, 8 and other components inside the rear cover 6.

In the first embodiment, as described above, the cap 50 is configured having a cap shape including the side wall part 52 which surrounds the fastening member 40 from the sides thereof, and the lid part 51 for covering the side wall part 52. Through this configuration, the fastening member 40 can be reliably covered by the cap-shaped cap 50, and the fastening member 40 can be stably retained.

In the first embodiment, as described above, the hook parts 31 protruding to the outside (outside in the X direction) with respect to the through-hole 6a are formed in the engaging parts 30 of the rear cover 6. The engaging holes 55 are formed in the engaging parts 53 of the cap 50. The engaging holes 55 are configured to be able to engage with the hook parts 31 from the outsides of the hook parts 31. During screw tightening in this configuration, an external force acts on the cap 50 in the advancing direction of the screw 80 (S) used to attach the wall-mount fixture 90, via the through-hole 6a. A force lifting at an angle toward the inside (in the direction approaching the through-hole 6a) in relation to the through-hole 6a therefore acts on the engaging parts 53 (engaging holes 55) of the cap 50. The rear cover 6 is also flexed by the external force so as to warp toward the inside thereof. A force directed outward from the through-hole 6a therefore acts on the hook parts 31. Therefore, by causing the hook parts 31 to protrude outward in relation to the through-hole 6a and causing the engaging holes 55 of the cap 50 to engage from the outside of the hook parts 31, when an external force is applied during screw tightening, the engaging holes 55 of the cap 50 is raised inward toward the hook parts 31. The hook parts 31 are subjected to a force directed outward (toward the engaging holes 55 side) by the flexing (inward warping) of the rear cover 6. The external force exerted during screw tightening can therefore be applied so that the engaging holes 55 and the hook parts 31 engage more securely. Through this configuration, the cap 50 can be kept from disengaging during screw tightening, as shown in FIG. 12.

In the first embodiment, as described above, the engaging parts 53 which include the engaging holes 55 are formed so as to flex more readily than (or to have higher flexibility than) the engaging parts 30 which include the hook parts 31. The hook parts 31 and the engaging holes 55 are engaged by flexing the engaging parts 53. When the engaging parts 53 are thus formed so as to flex more easily than the engaging parts 30, an external force directed inward with respect to the through-hole 6a acts on the engaging parts 53 during screw tightening. Through this configuration, the engaging parts 53 easily flex to the inside (toward the hook parts 31) during screw tightening, as shown in FIG. 12, enabling the hook parts 31 and the engaging holes 55 to be more securely engaged. Since the engaging parts 30 can be engaged with the engaging parts 53 without flexing, the reinforcing ribs 32 can be provided to the engaging parts 30. Thus, the mechanical strength of the engaging parts 30 can be increased. When the mechanical strength of the engaging parts 30 is increased in this manner, engagement between the engaging parts 53 and the engaging parts 30 can be maintained with almost no flexure of the engaging parts 30 even in cases in which the rear cover 6 is flexed (warped inward) by the external force F2 during screw tightening.

In the first embodiment, as described above, the lid part 51 which faces the internal surface 6b of the rear cover 6, and the side wall part 52 which extends toward the internal surface 6b of the rear cover 6 from a peripheral edge of the lid part 51 are formed in the cap 50. The engaging parts 53 extend to the outside from the peripheral edge of the lid part 51, and are configured so that the engaging holes 55 engage with the hook parts 31 on the outside of the side wall part 52. Through this configuration, the mechanical strength of the cap 50 can be enhanced by the lid part 51 and the side wall part 52. Since the cap 50 can thereby be made less readily deformable by external force, the fastening member 40 can be more reliably retained by the cap 50. Since the engaging parts 53 are configured so that the engaging holes 55 engage with the hook parts 31 on the outside of the side wall part 52, the engaging parts 53 can easily be made more flexible while the mechanical strength of the cap 50 itself is enhanced by the lid part 51 and the side wall part 52.

Second Embodiment

Referring now to FIGS. 14 to 18, a television apparatus 200 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may, be omitted for the sake of brevity.

The television apparatus 200 according to the second embodiment of the present disclosure will next be described with reference to FIGS. 14 through 18. With the first embodiment, each fixing part 14 is configured so that the cap 50 (engaging parts 53) and the rear cover 6 (engaging parts 30) are engaged by flexing the engaging parts 53 (arm parts 54) of the cap 50. On the other hand, the second embodiment is an example in which a fixing part 114 is configured so that a cap 150 and a rear cover 106 are engaged by sliding the cap 150 along an internal surface 106b of the rear cover 106. Aspects of the second embodiment other than the fixing part 114 are the same as in the first embodiment, and no further description will be given of aspects other than the fixing part 114.

Figure 14:
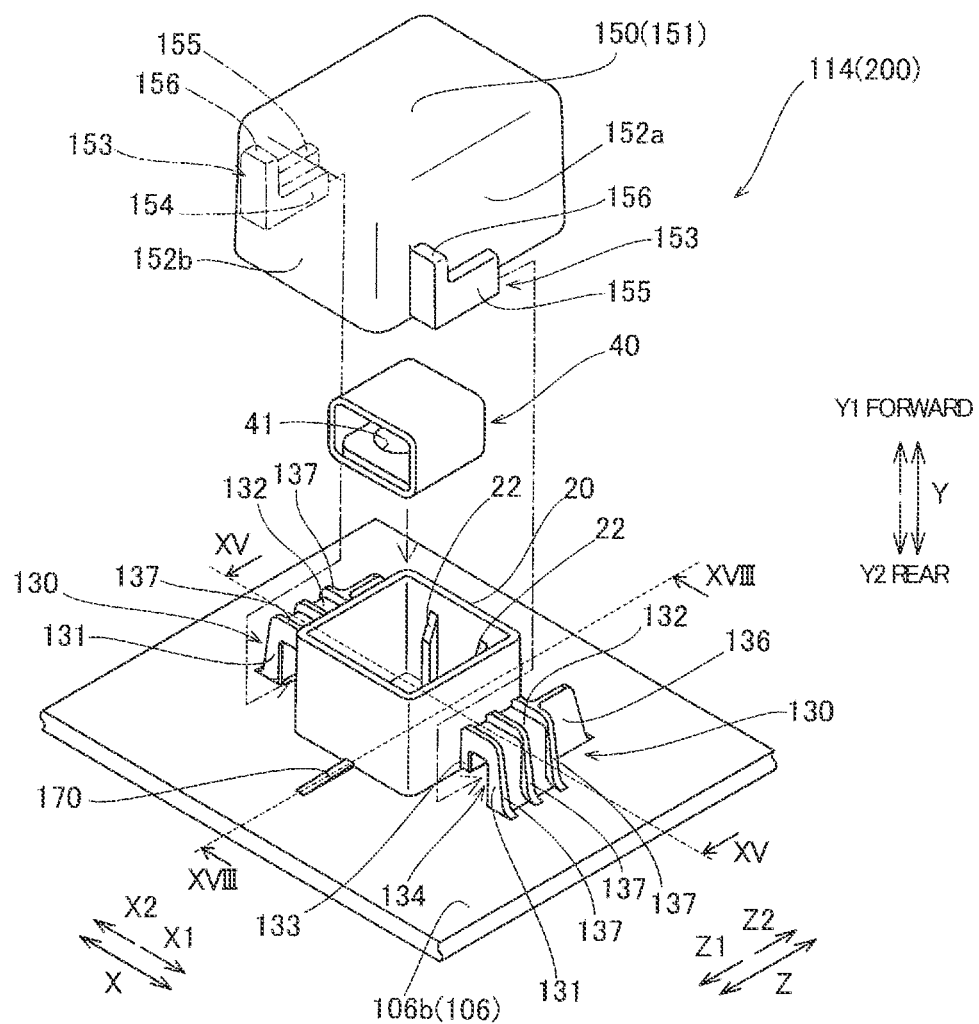
FIG. 14 is an exploded perspective view of a fixing part of a liquid crystal television apparatus in accordance with a second embodiment of the present disclosure.

As shown in FIG. 14, the fixing part 114 of the television apparatus 200 according to the second embodiment includes a pair of engaging parts 130, the fastening member 40, a cap 150 for retaining the fastening member 40, and the frame-shaped wall part 20 formed in a position corresponding to a through-hole 106a in the internal surface 106b of the rear cover 106. In the second embodiment, a restricting part 160 (see FIG. 16) for restricting the movement of the cap 150, and an inclined part 170 are formed on the internal surface 106b of the rear cover 106. The frame-shaped wall part 20 and the fastening member 40 are configured the same as in the first embodiment. The rear cover 106 and the cap 150 are examples of "rear chassis" and "attachment member", respectively, of the present disclosure. The engaging parts 130 are examples of a "second engaging part" and of a "second engaging piece" of the present disclosure.

Figure 15:
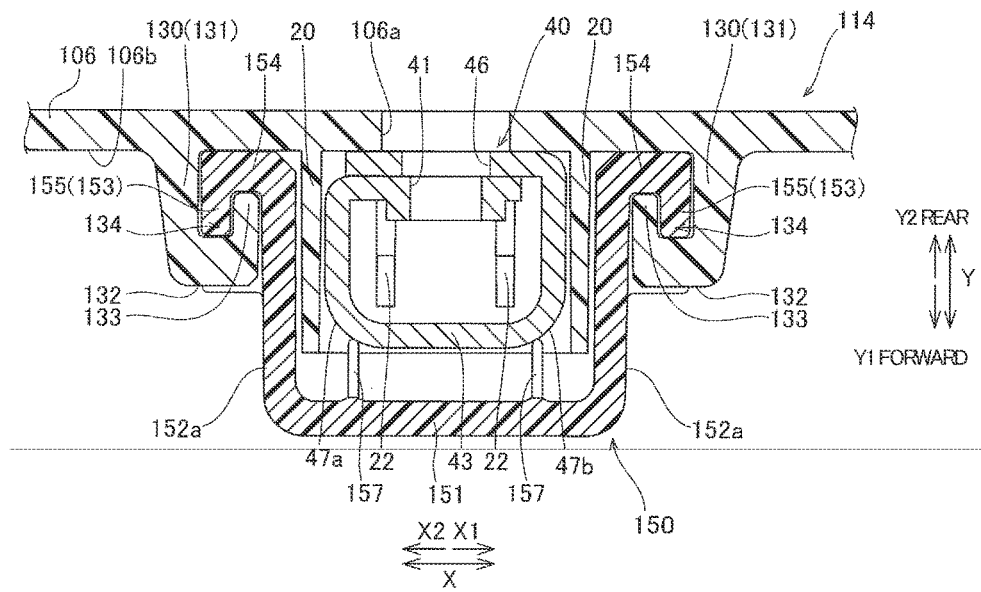
FIG. 15 is a cross sectional view taken along line XV-XV line in FIG. 14.

The engaging parts 130 are provided as a pair thereof on both sides of the frame-shaped wall part 20 in the X direction thereof. As shown in FIGS. 14 and 15, the engaging parts 130 includes engaging pieces which integrally include first portions 131, second portions 132 and third portions 133. The first portions 131 stand toward the inside (in the Y1 direction) from the internal surface 106b of the rear cover 106. The second portions 132 extend toward the frame-shaped wall part 20 along the internal surface 106b of the rear cover 106 from the apexes of the first portions 131. The third portions 133 extend toward the internal surface 106b from the ends of the second portions 132 on the frame-shaped wall part 20 side thereof. The engaging parts 130 have groove-shaped parts 134 surrounded by the internal surfaces of the first portions 131, the second portions 132, and the third portions 133 as viewed from the Z1 side. Wall parts 135 reinforced by reinforcing ribs 136 are formed on the Z2 sides of the engaging parts 130. The end portions on the Z2 side of the groove-shaped parts 134 are therefore blocked by the internal surfaces of the wall parts 135. Three stripe-shaped reinforcing ribs 137 are also formed on external surfaces of the first portions 131 and second portions 132, and the engaging parts 130 are thus reinforced.

Figure 18:
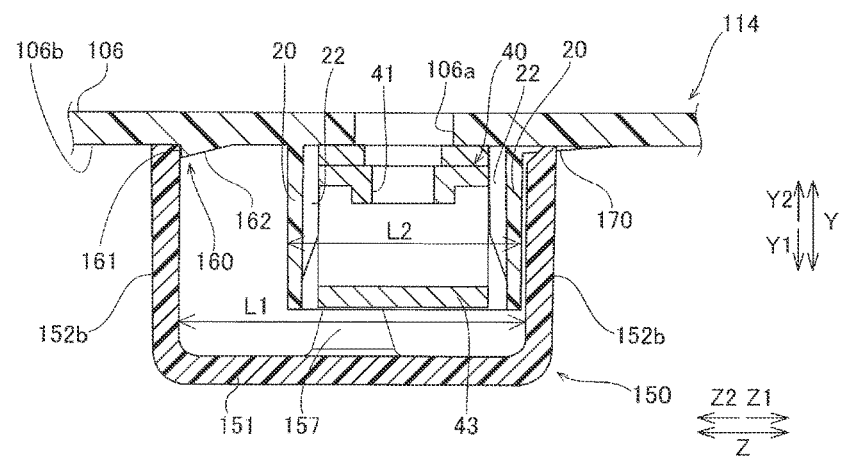
FIG. 18 is a cross sectional view taken along XVIII-XVIII line in FIG. 14, showing the action of attaching the cap.

The cap 150 according to the second embodiment has a lid part 151, a pair of side wall parts 152*a* on the longitudinal sides thereof, and a pair of side wall parts 152*b* on the lateral sides thereof, formed integrally with each other. The cap 150 is formed in a rectangular cap shape. Engaging parts 153 are integrally formed on the Z1 sides of the pair of side wall pads 152*a* on the longitudinal sides. As shown in FIG. 18, the longitudinal dimension (length L1) of the cap 150 is larger than the outside dimension (length L2) of the substantially square frame-shaped wall pad 20. The cap 150 is therefore able to slide in the longitudinal direction (Z direction) when fitted on the outside of the frame-shaped wall part 20. The engaging parts 153 are examples of a "first engaging part" and a "first engaging piece" of the present disclosure.

As shown in FIGS. 14 and 15, the engaging parts 153 include engaging pieces formed to correspond with the groove-shaped parts 134 of the engaging parts 130. Specifically, each of the engaging pads 153 includes a first portion 154, a second portion 155, and a wall-shaped third portion 156. The first portion 154, the second portion 155, and the wall-shaped third portion 156 are formed integrally with each other. The first portions 154 extend toward the outside (toward the engaging parts 130) in the X direction along the internal surface 106*b* of the rear cover 106 from bottom edges of the side wall parts 152*a*. The second portions 155 stand from outside (engaging part 130 side) end parts of the first portions 154. The wall-shaped third portions 156 are provided to Z1-side end pads. The engaging parts 153 are formed so as to engage with the engaging parts 130 of the rear cover 106 in the Y direction perpendicular to the internal surface 106*b* by the insertion of the first portions 154 and the second portions 155 into the groove-shaped parts 134 of the engaging parts 130.

In the cap 150 according to the second embodiment, a pair of protrusions 157 for urging the fastening member 40 toward the rear cover 106 in the state in which the engaging parts 153 and the engaging parts 130 are engaged is formed on the inside of the lid part 151, the same as in the cap 50 of the first embodiment. The protrusions 157 are examples of an "urging part" of the present disclosure.

Figure 16:
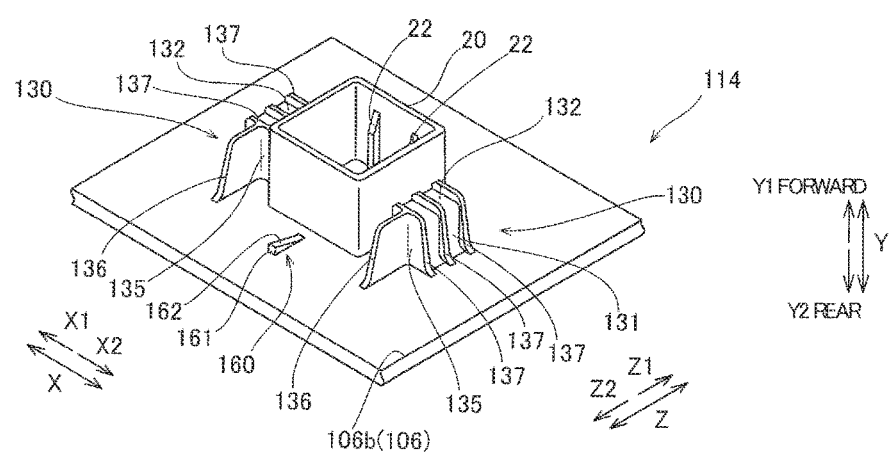
FIG. 16 is a perspective view of the fixing part showing a different side from FIG. 14.

As shown in FIG. 16, the restricting part 160 is formed on the Z2 side of the frame-shaped wall part 20. The restricting part 160 includes a locking surface 161 which stands substantially perpendicular to the internal surface 106*b* of the rear cover 106, and an inclined surface 162 inclined so as to approach the internal surface 106*b* progressively from the locking surface 161 to the frame-shaped wall part 20. The locking surface 161 is configured so as to make contact with the internal surface of a side wall part 152*b* on the lateral side of the cap 150 in the state in which the engaging parts 153 and the engaging parts 130 are engaged with each other (see FIG. 18).

As shown in FIG. 14, the inclined part 170 is linearly formed so as to extend in the Z1 direction from the surface of the frame-shaped wall part 20 on the Z1 side thereof. The inclined part 170 inclines so as to approach the internal surface 106*b* progressively from the frame-shaped watt part 20. The inclined part 170 is formed so as to be flexurally deformed (see FIG. 18) toward the rear cover 106 by an end surface of the side wall part 152*b* on the lateral side of the cap 150 when the engaging parts 153 and the engaging parts 130 are engaged. The inclination of the inclined part 170 is exaggerated in FIG. 18 to aid understanding.

The method for attaching the cap 150 of the television apparatus 200 according to the second embodiment will next be described with reference to FIGS. 14, 15, 17, and 18.

Figure 17:
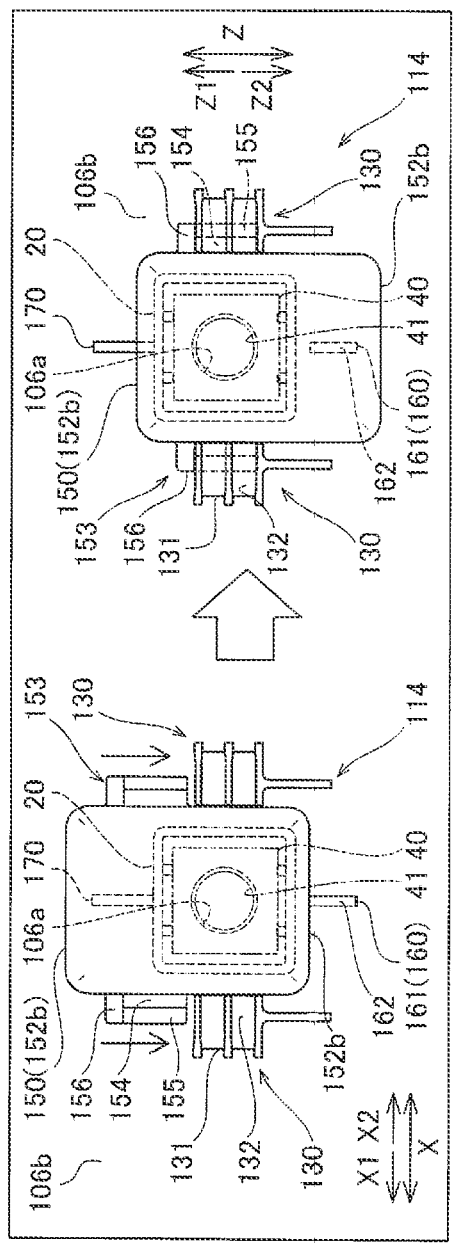
FIG. 17 is a schematic plan view showing the action of attaching the cap of the liquid crystal television apparatus illustrated in FIG. 14.

The fastening member 40 is first inserted into the frame-shaped wall part 20 as shown in FIG. 14. The cap 150 is then fitted on the outside of the frame-shaped wall part 20 in a state in which the position of the cap 150 is shifted in the Z1 direction so that no contact occurs between the engaging parts 153 and the engaging parts 130 of the rear cover 106, as shown in FIG. 17. The cap 150 is then slid in the Z2 direction along the internal surface 106*b* of the rear cover 106, whereupon the first portions 154 and second portions 155 of the engaging parts 153 are inserted into the groove-shaped parts 134 (see FIG. 15) of the engaging parts 130. The first portions 154 and second portions 155 of the engaging parts 153, and the second portions 132 and third portions 133 of the engaging parts 130 thereby engage in the Y direction orthogonal to the internal surface 106*b* as shown in FIG. 15. By the sliding of the cap 150 in the Z2 direction, the side wall part 152*b* of the cap 150 on the Z1 side thereof moves while running over the inclined part 170, and the side wall part 152*b* on the Z2 side moves while running over the inclined surface 162 of the restricting part 160, as shown in FIG. 18.

The cap 150 is moved until the third portions 156 of the engaging parts 153 make contact with end parts of the engaging parts 130 on the Z1 side thereof (see FIG. 17). The side wall part 152*b* of the cap 150 on the Z2 side thereof surmounts the inclined surface 162 of the restricting part 160 and makes contact with the locking surface 161. As a result, the cap 150 is restricted from sliding in the opposite direction (Z1 direction) by the restricting part 160. In this state, the side wall part 152*b* of the cap 150 on the Z1 side thereof is at the position (in the vicinity of the frame-shaped wall part 20) where the inclined part 170 protrudes furthest from the internal surface 106*b* of the rear cover 106. The inclined part 170 is pressed toward the rear cover 106 by the end surface of the side wall part 152*b* and flexurally deformed toward the rear cover 106. The cap 150 and the internal surface 106*b* of the rear cover 106 are thereby placed adjacent to each other with no gap therebetween. The cap 150 is prevented from rattling or buzzing. As shown in FIG. 15, the pair of protrusions 157 inside the cap 150 urges the inclined parts 47*a* and 47*b* of the fastening member 40 to align the positions of the through-hole 106*a* and the fastening member 40 in the X direction. The fastening member 40 is placed in close contact with the internal surface 106*b* of the rear cover 106 by the urging force of the protrusions 157.

In the second embodiment, as described above, the fastening member 40 and the cap 150 which has the engaging parts 153 for engaging with the internal surface 106*b* of the rear cover 106 are provided. The fastening member 40 can thereby be attached to the rear cover 106 merely by engaging the engaging parts 153 of the cap 150 with the internal surface 106*b* of the rear cover 106. A reduction in the working efficiency of assembly of the liquid crystal television apparatus 200 can thereby be prevented even in the case that a structure (fixing part 114) for attaching the wall-mount fixture 90 (see FIG. 2) is provided.

In the second embodiment, as described above, the engaging parts 153 (first portions 154 and second portions 155) protruding in the X direction along the internal surface 106*b* of the rear cover 106 are provided to the cap 150. The engaging parts 130 (first portions 131, second portions 132, and third portions 133) standing from the internal surface 106*b* of the rear cover 106 and extending in the X direction along the internal surface 106*b* are formed on the rear cover 106. Moving the cap 150 in the Z2 direction along the internal surface 106b of the rear cover 106 causes the engaging parts 153 to engage with the engaging parts 130 in the Y direction orthogonal to the internal surface 106b of the rear cover 106. Through this configuration, the engaging parts 153 and the engaging parts 130 can be engaged in the Y direction by sliding the cap 150 along the internal surface 106b. Therefore, there is no need to utilize flexural deformation to engage the engaging parts 153 and the engaging parts 130. Since the mechanical strength of the engaging parts 153 and engaging parts 130 can therefore be increased, the engagement of the engaging parts 153 and the engaging parts 130 can easily be strengthened against the effects of external force (external force in the Y1 direction orthogonal to the internal surface 106b of the rear cover 106) during screw tightening.

In the second embodiment, as described above, the rear cover 106 has the restricting part 160 formed thereon for restricting movement of the cap 150 in the Z1 direction along the internal surface 106b of the rear cover 106 when the engaging parts 153 and the engaging parts 130 are engaged. Since sliding of the cap 150 in the direction of releasing the engagement is restricted by the restricting part 160, engagement between the engaging parts 153 and the engaging parts 130 can be easily and reliably maintained.

The other effects of the second embodiment are the same as those of the first embodiment.

Third Embodiment

Figure 19:
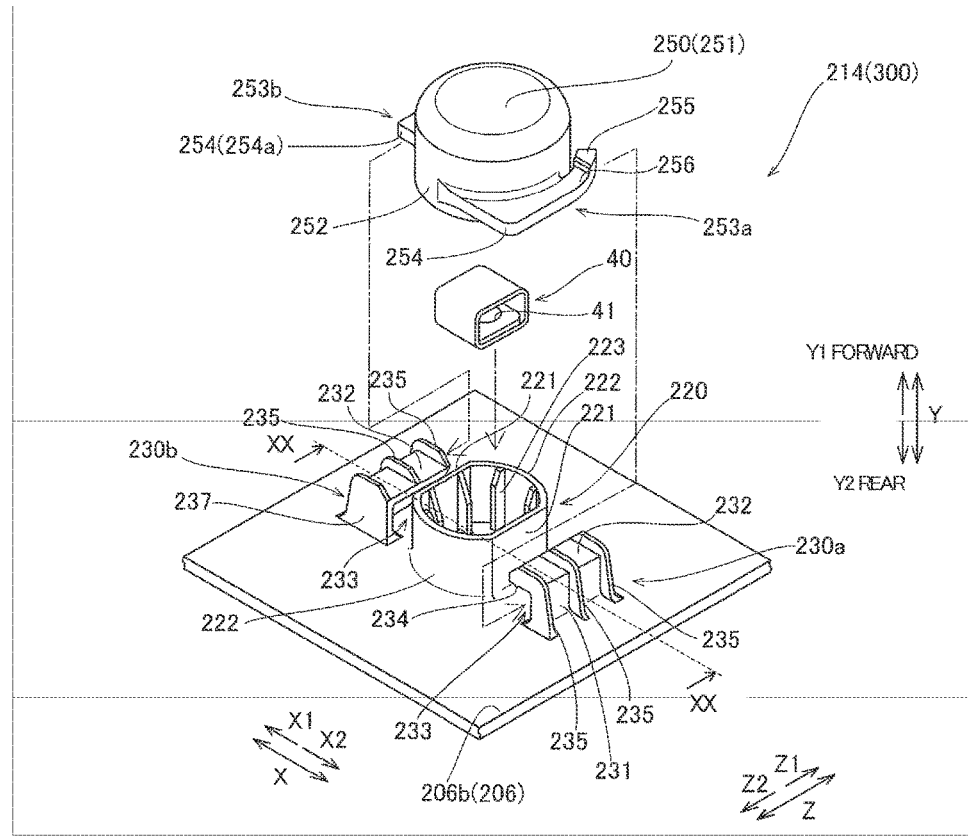
FIG. 19 is an exploded perspective view of a fixing part of a liquid crystal television apparatus in accordance with a third embodiment of the present disclosure.
Figure 20:
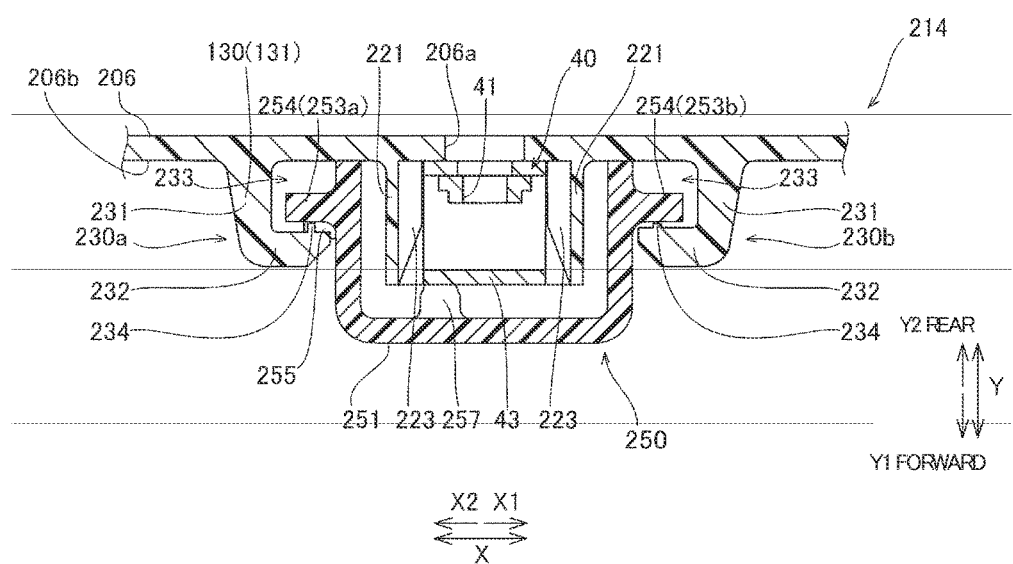
FIG. 20 is a cross sectional view taken along XX-XX line in FIG. 19.
Figure 21:
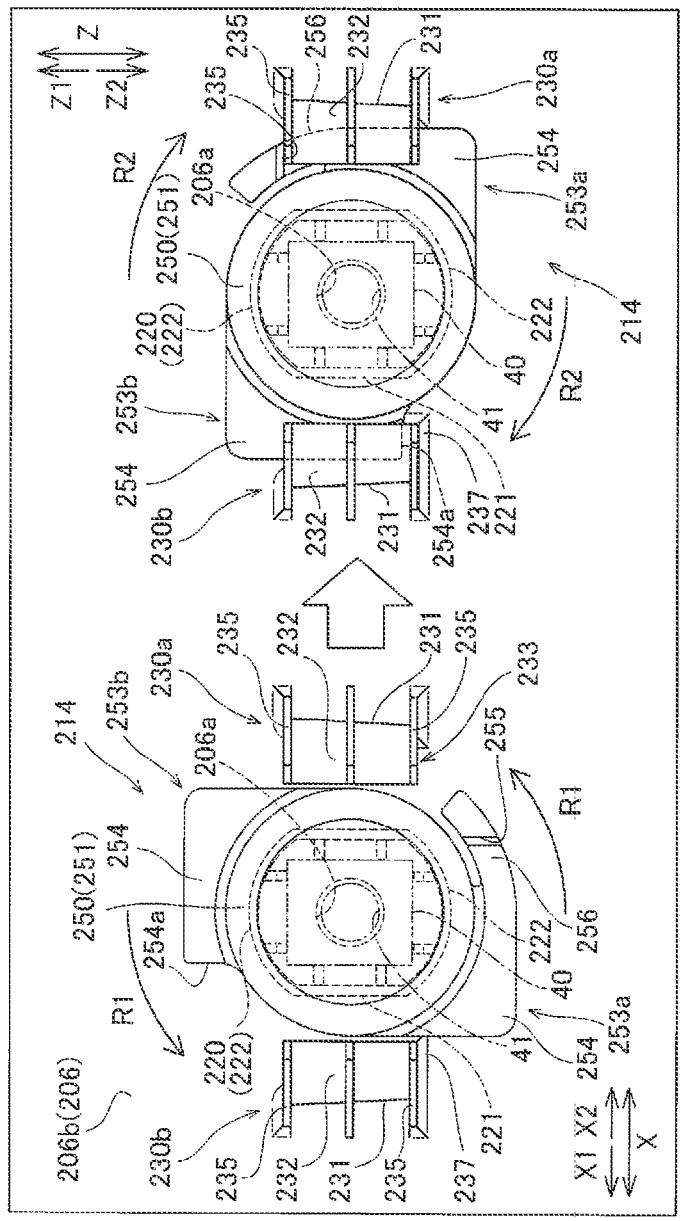
FIG. 21 is a schematic plan view showing the action of attaching the cap of the liquid crystal television apparatus illustrated in FIG. 19.

Referring now to FIGS. 19 to 21, a television apparatus 300 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The television apparatus 300 according to the third embodiment of the present disclosure will next be described with reference to FIGS. 19 through 21. With the second embodiment, each fixing part 114 is configured so that the cap 150 and the rear cover 106 are engaged by sliding the cap 150 in the Z direction along the internal surface 106b of the rear cover 106. On the other hand, the third embodiment is an example in which a fixing part 214 is configured so that a cap 250 and a rear cover 206 are engaged by rotating the cap 150 in the plane of an internal surface 206b of the rear cover 206. Aspects of the third embodiment other than the fixing part 214 are the same as in the first embodiment, and no further description will be given of aspects other than the fixing part 214.

As shown in FIG. 19, the fixing part 214 of the television apparatus 300 according to the third embodiment includes a pair of engaging parts 230a and 230b, the fastening member 40, a cap 250 for retaining the fastening member 40, and a frame-shaped wall part 220 formed in a position corresponding to the through-hole 6a in the internal surface 206b of the rear cover 206. The fastening member 40 is configured the same as in the first embodiment. The rear cover 206 and the cap 250 are examples of a "rear chassis" and an "attachment member," respectively, of the present disclosure. The engaging parts 230a and 230b are examples of a "second engaging part" and of a "second engaging piece" of the present disclosure.

In the third embodiment, the frame-shaped wall part 220 includes a pair of linear parts 221 and a pair of arc-shaped parts 222, and is formed integrally with the rear cover 206 so as to surround the through-hole 6a. The frame-shaped wall part 220 of the third embodiment is therefore formed in an elongated, substantially cylindrical shape. Rib-shaped positioning parts 223 are formed integrally on the inside of the pair of linear parts 221 and the pair of arc-shaped parts 222. The linear parts 221 in the pair thereof are disposed facing each other in the X direction. The arc-shaped parts 222 in the pair thereof are disposed facing each other in the Z direction.

The engaging parts 230a and 230b in the pair thereof are provided on the outsides of the frame-shaped wall part 220 in the X direction. As shown in FIG. 20, the engaging parts 230a and 230b have engaging pieces which integrally include first portions 231 and second portions 232, respectively. The first portions 231 stand toward the inside (in the Y1 direction) from the internal surface 206b of the rear cover 206. The second portions 232 extend toward the frame-shaped wall part 220 along the internal surface 206b of the rear cover 206 from the apexes of the first portions 231. Groove-shaped parts 233 surrounded by the first portions 231, the second portions 232, and the internal surface 206b of the rear cover 206 are thereby formed in each of the engaging parts 230a and 230b. Rib-shaped projections 234 which protrude toward the rear cover 206 are formed on internal surfaces (surfaces on the internal surface 206b side) of the second portions 232 so as to extend in the Z direction. Three stripe-shaped reinforcing ribs 235 are also formed on external surfaces of the first portions 231 and second portions 232. The engaging parts 230a (230b) are thus reinforced.

As shown in FIG. 19, a wall part 237 is formed at an end part on the Z2 side of the engaging part 230b on the X1 side. The groove-shaped part 233 of the engaging part 230b is blocked by the end part on the Z2 side. Meanwhile, wall parts are not formed at the end part of the engaging part 230b on the side or at both end parts in the Z direction of the engaging part 230a on the X2 side. Consequently, the groove-shaped part 233 of the engaging part 230b penetrates through in only the Z1 direction. The groove-shaped part 233 of the engaging part 230a penetrates through on both sides in the Z direction.

The cap 250 according to the third embodiment is formed in a round cap shape having a lid part 251 circular in plan view and a circumferential (cylindrical) side wall part 252 formed integrally with each other. The side wall part 252 extends toward the rear cover 206 from the peripheral edge of the lid part 251. Two engaging parts 253a and 253h are formed integrally with the side wall part 252. The size of the inside diameter of the side wall part 252 of the cap 250 corresponds to the outside diameter of a circle connecting the pair of arc-shaped parts 222 of the frame-shaped wall part 220. The cap 250 is configured so as to be rotatable (slidable) along the arc-shaped parts 222 in the plane along the internal surface 206b of the rear cover 206 in the state in which the cap 250 is fitted on the outside of the frame-shaped wall part 220. The engaging parts 253a and 253b are configured such that rotating the cap 250 causes the engaging parts 253a and 253b to be inserted in the groove-shaped parts 233 of the engaging part 230a and the engaging part 230b, respectively, thereby engaging with the engaging part 230a and engaging part 230b. The engaging parts 253a and 253B are examples of a "first engaging part" and a "first engaging piece," respectively, of the present disclosure.

The engaging part 253a has an engaging piece which integrally includes a hook-shaped restricting part 255 and a plate-shaped piece 254. The plate-shaped piece 254 extends to the outside of the side wall part 252 along the internal surface 206b of the rear cover 206. The plate-shaped piece 254 is formed so as to extend along an external periphery of the circumferential side wall part 252. The plate-shaped piece 254 is formed at a (predetermined height on the external periphery of the side wall part 252 so as to be able to make contact with the projection 234 of the engaging part 230a disposed on the X2 side. The plate-shaped piece 254 is configured so as to flexurally deform the projection 234 when the engaging part 253a and the engaging part 230a are engaged.

The restricting part 255 is formed on an arm part 256 which extends along the external periphery of the circumferential side wall part 252 from an end part of the plate-shaped piece 254. The restricting part 255 has a hook shape protruding to the opposite side (Y1 direction) from the internal surface 206b of the rear cover 206, and is formed so as to engage (see FIG. 21) with an end part on the Z1 side of the engaging part 230b disposed on the X2 side.

As shown in FIGS. 19 and 21, the engaging part 253b is an engaging piece with which only the plate-shaped piece 254 is formed integrally. An arm part 256 and a restricting part 255 are not formed on the plate-shaped piece 254 of the engaging part 253b. The plate-shaped piece 254 of the engaging part 253b is configured so as to make contact with the projection 234 of the engaging part 230b disposed on the X1 side, and to make contact with the wall part 237 of the engaging part 230b at an end part 254a thereof.

As shown in FIG. 20, a protrusion 257 is formed on an internal surface of the lid part 251 to urge the fastening member 40 toward the rear cover 206 in the state in which the engaging parts 253a and 253b and the engaging parts 230a and 230b are respectively engaged. The protrusion 257 is an example of an "urging part" of the present disclosure.

The method for attaching the cap 250 of the television apparatus 300 according to the third embodiment will next be described with reference to FIGS. 19 through 21.

The fastening member 40 is first inserted into the frame-shaped wall part 220 as shown in FIG. 19. The cap 250 is then fitted on the outside of the frame shaped wall part 220 while the orientation of the cap 250 is adjusted so that the engaging part 253a is disposed on the Z2 side of the frame-shaped wall part 220 and the engaging part 253b is disposed on the Z1 side of the frame-shaped wall part 220, as shown in FIG. 21. The cap 250 is then rotated in the R1 direction in the plane of the internal surface 206b of the rear cover 206. The engaging part 253a is thereby inserted from the Z2 side into the groove-shaped part 233 of the engaging part 230a on the X2 side, and the engaging part 253b is inserted from the Z1 side into the groove-shaped part 233 of the engaging part 230b on the X1 side. In conjunction with the rotation of the cap 250 at this time, the restricting part 255 of the engaging part 253a is inserted into the groove-shaped part 233 by causing the arm part 256 to flex toward the rear cover 206.

When the cap 250 is rotated until the restricting part 255 of the engaging part 253a surmounts the end part of the engaging part 230a on the Z1 side thereof (the restricting part 255 leaves the groove-shaped part 233), the flexure of the arm part 256 is released and the arm part 256 restores to the original position thereof. The restricting part 255 is thereby engaged with the end part of the engaging part 230a on the Z1 side thereof, and rotation of the cap 250 in the R2 direction is restricted. Since the end part 254a of the engaging part 253b is in contact with the wall part 237 on the Z2 side of the engaging part 230b at this time, the cap 250 is restricted from rotating further in the R1 direction.

The plate-shaped piece 254 of the engaging part 253a, and the projection 234 of the engaging part 230a thereby make contact. The engaging part 253a and the engaging part 230a engage in the Y direction orthogonal to the internal surface 106b, as shown in FIG. 20. In the same manner, the plate-shaped piece 254 of the engaging part 253b, and the projection 234 of the engaging part 230b make contact. The engaging part 253b and the engaging part 230b engage in the Y direction orthogonal to the internal surface 106b. In this engaged state, the respective projections 234 of the engaging part 230a and the engaging part 230b are flexurally deformed in the Y1 direction by the pressure of the plate-shaped pieces 254. The cap 250 and the rear cover 206 are thereby placed adjacent to each other with no gap therebetween. The cap 250 is prevented from rattling or buzzing. Inside the cap 250, the protrusion 257 urges the fastening member 40 so that the fastening member 40 is placed in close contact with the internal surface 206b of the rear cover 206.

In the third embodiment, as described above, the fastening member 40 and the cap 250 which has the engaging parts 253a and 253b for engaging with the internal surface 206b of the rear cover 206 are provided. The fastening member 40 can thereby be attached to the rear cover 206 merely by engaging the engaging parts 253a and 253b of the cap 250 with the internal surface 206b of the rear cover 206. A reduction in the working efficiency of assembly of the liquid crystal television apparatus 300 can thereby be prevented in the case that a structure (fixing part 214) for attaching the wall-mount fixture 90 (see FIG. 2) is provided.

In the third embodiment, as described above, the engaging parts 253a and 253b including plate-shaped pieces 254 protruding along the internal surface 206b of the rear cover 206 are provided to the cap 250. The engaging parts 230a and 230b (first portions 231 and second portions 232) standing from the internal surface 206b attic rear cover 206 and extending in the X direction along the internal surface 206b are formed on the rear cover 206. Moving (rotating) the cap 250 in the direction along the internal surface 206b of the rear cover 206 causes the engaging part 253a (253b) to engage with the engaging part 230a (230b) in the Y direction orthogonal to the internal surface 206b of the rear cover 206. The engaging part 253a (253b) and the engaging part 230a (230b) can be engaged in the Y direction by rotating the cap 250 in the plane of the internal surface 206b of the rear cover 206. Therefore, there is no need to utilize flexural deformation to engage the engaging part 253a (253b) and the engaging part 230a (230b). Since the mechanical strength of the engaging part 253a (253h) and engaging part 230a (230b) can therefore be increased, the engagement of the engaging part 253a (253b) and the engaging part 230a (230b) can easily be strengthened against the effects of external force (external force in the Y1 direction orthogonal to the internal surface 206b of the rear cover 206) during screw tightening.

In the third embodiment, as described above, the cap 250 has the restricting part 255 formed thereon for restricting movement of the cap 250 in the R2 direction in the plane of the internal surface 206b of the rear cover 206 when the engaging part 253a (253b) and the engaging part 230a (230h) are engaged. Since rotation of the cap 250 in the R2 direction of releasing the engagement is restricted by the restricting part 255, engagement between the engaging parts 253a, 253b and the engaging parts 230a, 230b can be easily and reliably maintained.

The other effects of the third embodiment are the same as those of the second embodiment.

The embodiments described herein are in all respects merely examples, and shall not be construed as limiting the present invention. The scope of the present invention is defined by the claims and not the embodiments described above, and includes all equivalents to the claims and modifications within the intended scope thereof.

For example, an application of the present disclosure to a liquid crystal television apparatus is described as an example of the television apparatus and electronic device in the first through third embodiments. However, the present disclosure is not limited to this application. For example, the present disclosure can also be applied to a personal computer monitor or other display apparatus, or to a television apparatus other than a liquid crystal television apparatus, for example. The present disclosure is also applicable to a photo frame, speaker, or other electronic device.

Figure 22:
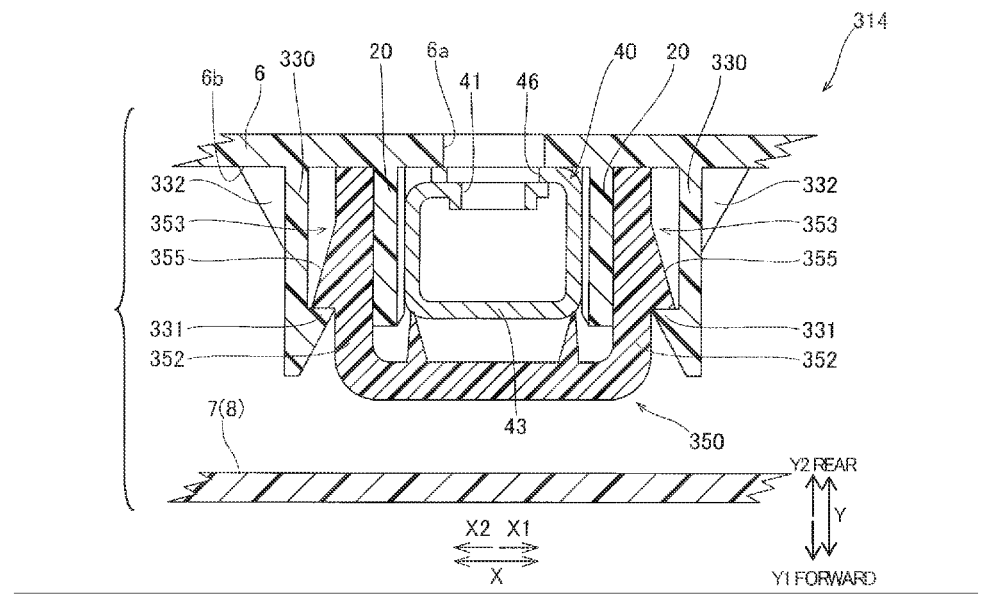
FIG. 22 is a cross sectional view of a modified fixing part of a modified liquid crystal television apparatus.

The first embodiment describes an example in which the engaging parts 53 (engaging holes 55) of the cap 50 are engaged from the outside of the engaging parts 30 (hook parts 31) of the rear cover 6. However, the present disclosure is not limited to this configuration. In the present disclosure, a configuration can be adopted in which engaging parts 353 of a cap 350 are engaged from the insides (insides in the X direction) of engaging parts 330 of the rear cover 6, as shown in FIG. 22. In a fixing part 314 according to this modification, the cap 350 integrally includes a pair of engaging parts 353 having hook parts 355 which protrude outward in the X direction from side wall parts 352. The cap 350 and the engaging parts 353 are examples of an "attachment member" and a "first engaging part" of the present disclosure. In the rear cover 6, the engaging parts 330 in the pair thereof are disposed on the outside of the pair of engaging parts 353 in the X direction thereof. The engaging parts 330 are examples of a "second engaging part" of the present disclosure. Each engaging part 330 integrally includes a hook part 331 and a reinforcing rib 332. The hook part 331 protrudes inward in the X direction. The reinforcing rib 332 extends outward in the X direction and inclined so as to increase in width progressively toward the internal surface 6b of the rear cover 6. In this modification, when the cap 350 is fitted on the outside of the frame-shaped wall part 20, the hook parts 355 in the pair thereof advance while flexing the respective engaging parts 330 (hook parts 331) of the pair thereof outward in the X direction. As the apexes of the hook parts 355 surmount the apexes of the hook parts 331, the engaging parts 353 (hook parts 355) and the engaging parts 330 (hook parts 331) engage in the Y direction.

This configuration will be further described in detail later through reference to FIGS. 23 to 32 as a fourth embodiment of the present disclosure.

The first embodiment describes an example in which engaging holes 55 formed by through-holes are formed in the cap 50 as an example of the engaging concavity of the present disclosure. However, the present disclosure is not limited to this configuration. The engaging concavity of the present disclosure can also be a concavity that does not penetrate completely through, insofar as the concavity is capable of engaging with a hook part.

The first through third embodiments describe examples in which the fastening member 40 used is formed by folding sheet metal. However, the present disclosure is not limited to this configuration. A common nut, for example, or other fastening member can also be used.

The first through third embodiments describe examples in which the fastening member 40 used has an inclined surface formed therein by folding sheet metal, and the inclined surfaces are urged by the protrusion in the cap. The present disclosure is not limited to this configuration. An inclined surface can not necessarily be provided to the fastening member in the present disclosure. A protrusion is also not necessarily provided to the cap. In the case that a protrusion is provided to the cap, any portion of the fastening member can be urged.

The first through third embodiments describe examples in which the rear cover 6 for partially covering the back of the liquid crystal television apparatus is used as an example of a "rear chassis" of the present disclosure. However, the present disclosure is not limited to this configuration. The rear cover can also cover the entire back of the television apparatus in the present disclosure.

The first through third embodiments describe examples in which the positioning part is formed integrally with the frame-shaped wall part of the rear cover 6. However, the present disclosure is not limited to this configuration. A positioning part can be provided separately from the frame-shaped wall part in the present disclosure, or a positioning part can not be provided.

The first through third embodiments describe examples in which the frame-shaped wall part is formed integrally with the rear cover 6. However, the present disclosure is not limited to this configuration. A frame-shaped wall part is not necessarily provided to the rear cover 6.

The first through third embodiments describe examples in which the cap including the lid part, the side wall parts, and the engaging parts (first engaging parts) formed integrally therewith is used as an example of an "attachment member" of the present disclosure. However, the present disclosure is not limited to this configuration. For example, the attachment member used can include only a lid part and a first engaging part, and not side wall parts.

The first through third embodiments describe examples in which the cap used as an example of an "attachment member" of the present disclosure is one in which the side wall parts of the cap are formed so as to surround the external periphery of the frame-shaped wall part. However, the present disclosure is not limited to this configuration. The cap can be configured such that the side wall parts of the cap partially surround the external periphery of the frame-shaped wall part.

The first through third embodiments describe examples in which the cap used as an example of an "attachment member" of the present disclosure is formed so that the fastening member 40 is covered by the lid part and the side wall parts. However, the present disclosure is not limited to this configuration. The attachment member can be formed so that the fastening member 40 is partially exposed inside the rear cover 6, and not so that the attachment member completely covers the fastening member 40.

Fourth Embodiment

Referring now to FIGS. 23 to 32, a flat-screen television receiver 400 (e.g., television apparatus) in accordance with a fourth embodiment will now be explained.

Figure 23:
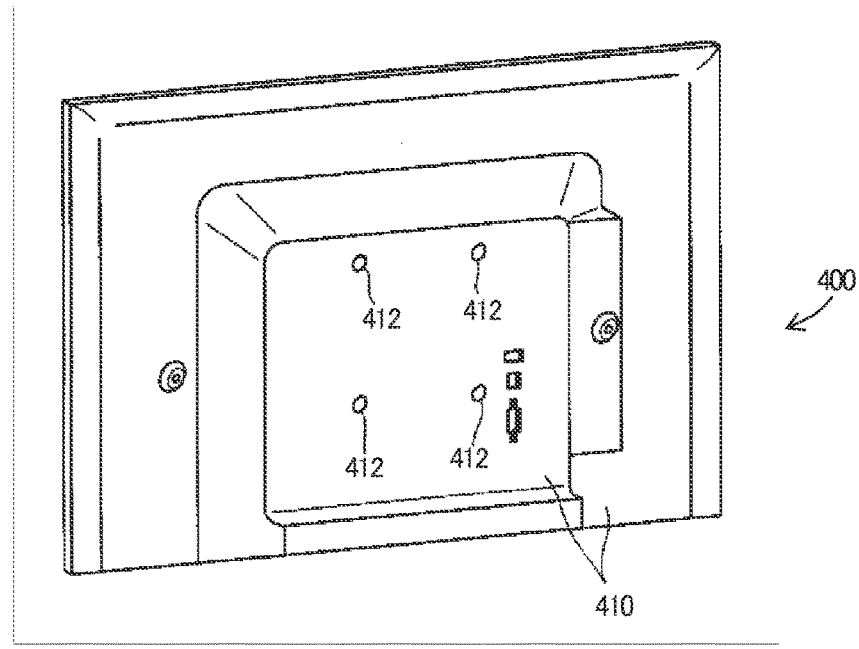
FIG. 23 is a rear perspective view of a television receiver in accordance with the fourth embodiment.
Figure 24:
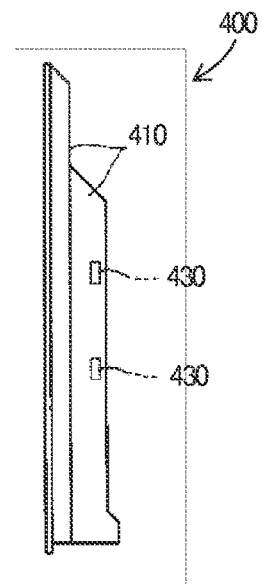
FIG. 24 is a side elevational view of the television receiver illustrated in FIG. 23.

FIG. 23 is a rear perspective view of the television receiver 400. The television receiver 400 includes a liquid crystal television apparatus. A connecting device or connecting structure of the present disclosure is employed in the television receiver 400. FIG. 24 is a side elevational view of the television receiver 400.

The flat-screen television receiver 400 shown in FIG. 23 includes a back panel 410 (e.g., a rear panel or rear chassis) with a plurality of through-holes 412. The back panel 410 covers a liquid crystal display module (not shown) from the back thereof. The through-holes 412 are formed at four locations in the back panel 410. As shown in FIG. 24, a plurality of attachment fixtures 430 (e.g., fastening members) of the connecting device are attached at four locations (only two are shown in FIG. 24) on the inside of the back panel 410. Each of the attachment fixtures 430 faces respective one of the through-holes 412. When the flat-screen television receiver 400 is used in a wall-mounted configuration, a wall-mount fitting (not shown) (e.g., a wall-mount fixture) superposed on an outer surface of the back panel 410 is fixed to the back panel 410 using machine screws or screws 402 (see in FIG. 28) inserted in the through-holes 412 and screwed into threaded holes (not shown). The flat-screen television receiver 400 is attached to a wall surface by engaging a hook part provided to the wall-mount fitting with a mating-side locking member fixed to an indoor wall surface, for example.

Figure 25:
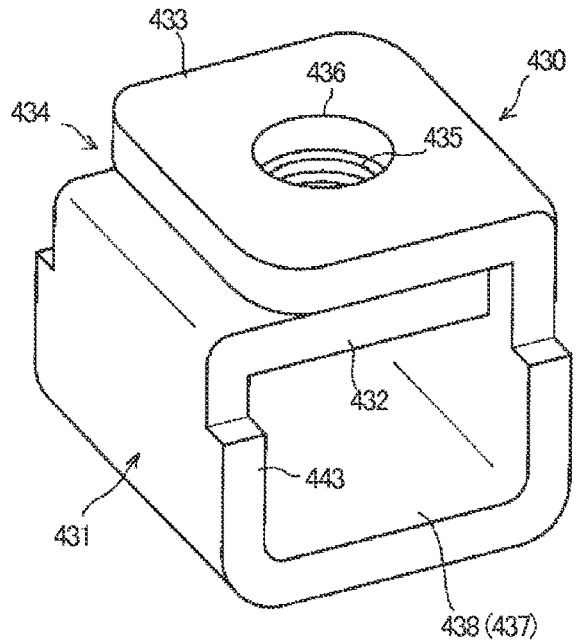
FIG. 25 is a perspective view of an attachment fixture used in the television receiver illustrated in FIG. 23.
Figure 26:
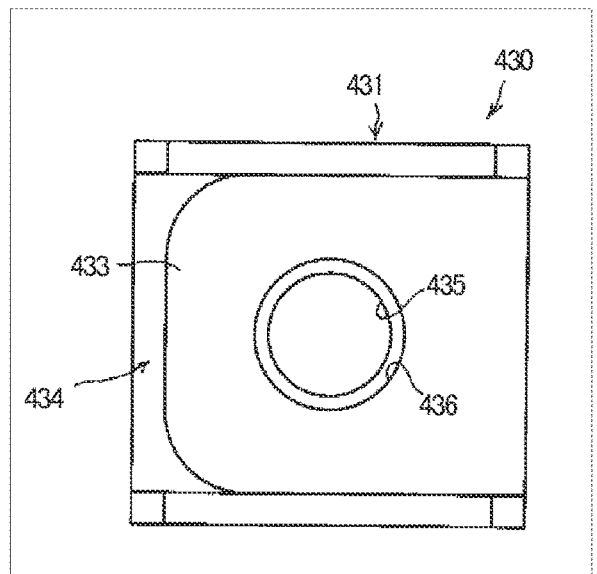
FIG. 26 is a top plan view of the attachment fixture illustrated in FIG. 25.
Figure 27:
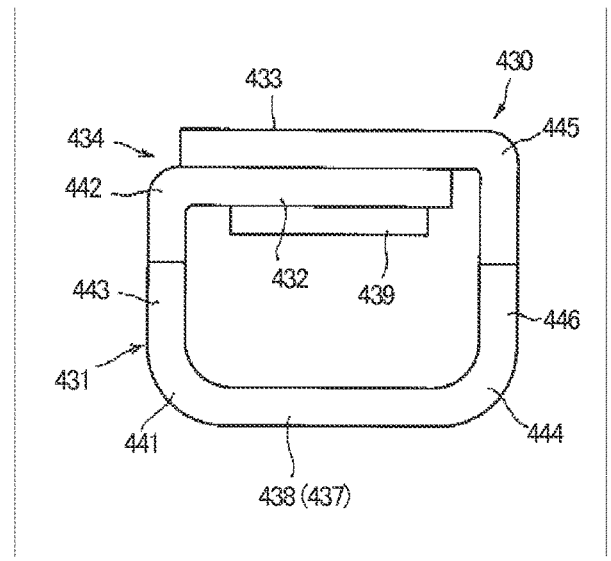
FIG. 27 is a side elevational view of the attachment fixture illustrated in FIG. 25.

FIG. 25 is a perspective view of the attachment fixture 430, FIG. 26 is a top plan view of the attachment fixture 430, and FIG. 27 is a side elevational view of the attachment fixture 430. The attachment fixture 430 is identical to or similar to the fastening member 40 shown in FIG. 9.

As shown in FIGS. 25 through 27, the attachment fixture 430 has an attachment fixture body 431 formed in a substantially rectangular ring shape in plan view by folding a thick band-shaped sheet-metal member in a plurality of locations (four locations in the example shown in FIG. 25) in the longitudinal direction thereof. The attachment fixture 430 is integrally formed as a one-piece, unitary member. The attachment fixture body 431 has a plate-shaped part 437 (e.g., a receiving part), and first and second bent parts that extend from the plate-shaped part 437. The first bent part has an end or inside piece 432 (e.g., a first end plate) with a threaded hole 435. The second bent part has an end or outside piece 433 (e.g., a second end plate) with a machine screw insertion hole 436 (e.g., screw insertion hole). The attachment fixture body 431 also has an overlapping part 434 in which the inside piece 432 at one end in the longitudinal direction and the outside piece 433 at the other end in the longitudinal direction of the sheet-metal member overlap each other. Furthermore, with the overlapping part 434, the inside piece 432 at one end is disposed on the inside, and the outside piece 433 at the other end is disposed on the outside. The threaded hole 435 passing through the inside piece 432 is formed in the center of the inside piece 432 at one end, while the machine screw insertion hole 436 having a somewhat larger diameter than the threaded hole 435 is formed in the center of the outside piece 433 at the other end. The machine screw insertion hole 436 is concentrically formed relative to the threaded hole 435. The receiving part 438 receives a distal end part 404 (e.g., distal end) of the machine screw 402 such that the machine screw 402 is prevented from being screwed beyond the receiving part 438.

The plate-shaped part 437 has a substantially rectangular shape, and faces with the overlapping part 434. In a case in which a machine screw (not shown) inserted in the machine screw insertion hole 436 of the overlapping part 434 and screwed into the threaded hole 435 protrudes past a certain length through the threaded hole 435, the plate-shaped part 437 serves as a receiving part 438 for stopping a distal end part of the machine screw and preventing the machine screw from screwing in too far. As is apparent from FIG. 27, in the attachment fixture 430 according to this embodiment, a protruding part 439 formed by a burring process is formed in the inside piece 432 as a measure for extending the axial length of the threaded hole 435 formed in the inside piece 432. Furthermore, a hole part formed by the protruding part 439 is included in the threaded hole 435.

As shown in FIG. 27, the attachment fixture body 431 includes the inside piece 432, the outside piece 433, and the plate-shaped part 437 which forms the receiving part 438. Furthermore, the attachment fixture body 431 includes a side plate part 443 (e.g., first side plate) on one side and a side plate part 446 (e.g., second side plate) on the other side. The side plate part 443 on one side is connectedly provided to one end part (e.g., a first end portion) in the longitudinal direction of the plate-shaped part 437 and to the inside piece 432 so as to extend therebetween via folded parts 441 and 442. The folded part 441 is disposed between the one end part of the plate-shaped part 437 and the side plate part 443. The side plate part 446 on the other side is connectedly provided to the other end part (e.g., a second end portion) in the longitudinal direction of the plate-shaped part 437 and to the outside piece 433 so as to extend therebetween via folded parts 444 and 445. The folded part 444 is disposed between the other end part of the plate-shaped part 437 and the side plate part 446.

When the configuration described above is adopted for the attachment fixture 430, the process of fabricating the attachment fixture 430 includes only bending, hole drilling, screw thread cutting, or the like of a band-shaped sheet-metal member. Thus, there is no need for a deep-drawing process for forming a cavity as a conventional attachment fixture. Therefore, not only can the attachment fixture 430 be easily fabricated, but the fabrication process is advantageous over that of the conventional attachment fixture in terms of material, technique, cost, and other factors. The defect rate also decreases, and size reduction is also more easily promoted.

Figure 28:
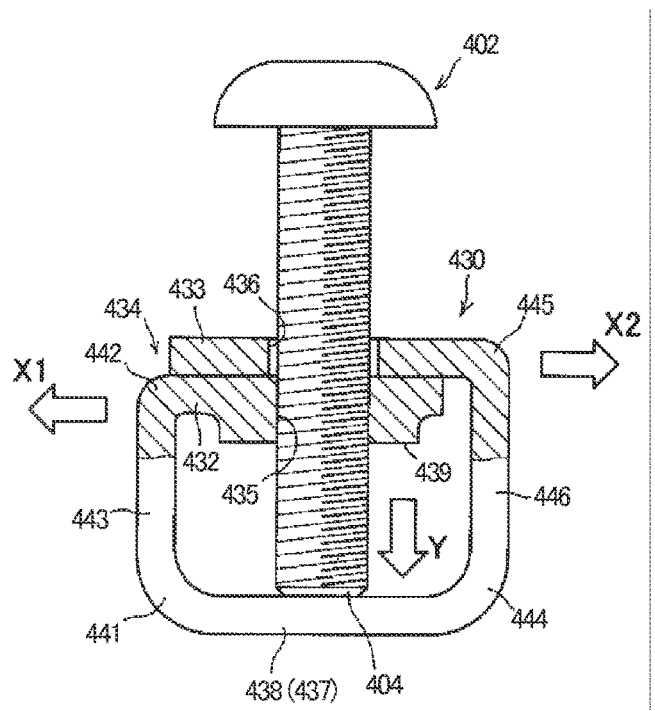
FIG. 28 is a side elevational view of the attachment fixture with a machine screw, with a part of the attachment fixture broken away for illustrating connection between the attachment fixture and the machine screw.

FIG. 28 is a side elevational view of the attachment fixture 430 showing a state in which the attachment fixture 430 and the machine screw 402 are coupled. As shown in FIG. 28, the machine screw 402 is inserted in the machine screw insertion hole 436 provided in the overlapping part 434 of the attachment fixture 430 and screwed into the threaded hole 435. In the case that the machine screw 402 screwed into the threaded hole 435 in this manner has an appropriate axial length, there is no possibility of the distal end part 404 of the machine screw 402 abutting the receiving part 438 by being screwed in too far. However, when the machine screw 402 having a large axial length is misapplied and screwed into the threaded hole 435 as shown in FIG. 28, screwing in of the machine screw 402 too far leads to a situation in which the machine screw 402 protrudes significantly from the threaded hole 435 and the distal end part 404 abuts the receiving part 438. Notwithstanding such a situation, since the receiving part 438 stops the distal end part 404 of the machine screw 402 and prevents the machine screw 402 from screwing in too far, it is impossible for the distal end part 404 of the machine screw 402 to protrude past the receiving part 438. Consequently, there is no risk of the distal end part 404 of the machine screw 402 protruding past the receiving part 438 and contacting any object facing the receiving part 438 outside of the attachment fixture 430, such as wiring boards, electrical/electronic components, or other mechanical components, for example.

As shown in FIG. 28, when the machine screw 402 having a large axial length is misapplied and screwed into the threaded hole 435, a condition occurs in which the receiving part 438 is pushed in the direction of the arrow Y by the abutting of the distal end part 404 against the receiving part 438. The receiving part 438 receives a deforming load which causes the inside piece 432 and the outside piece 433 to open outward as indicated by the arrows X1 and X2 at the overlapping part 434 of the attachment fixture 430. However, the machine screw 402 is passed through the threaded hole 435 of the inside piece 432 and the machine screw insertion hole 436 of the outside piece 433. Thus, the machine screw 402 prevents the inside piece 432 and the outside piece 433 from being deformed open by the load described above. Therefore, deformation of the attachment fixture 430 also cannot occur.

A structure for attaching the attachment fixture 430 described above to the flat-screen television receiver 400 shown in FIGS. 23 and 24 will next be described.

Figure 29:
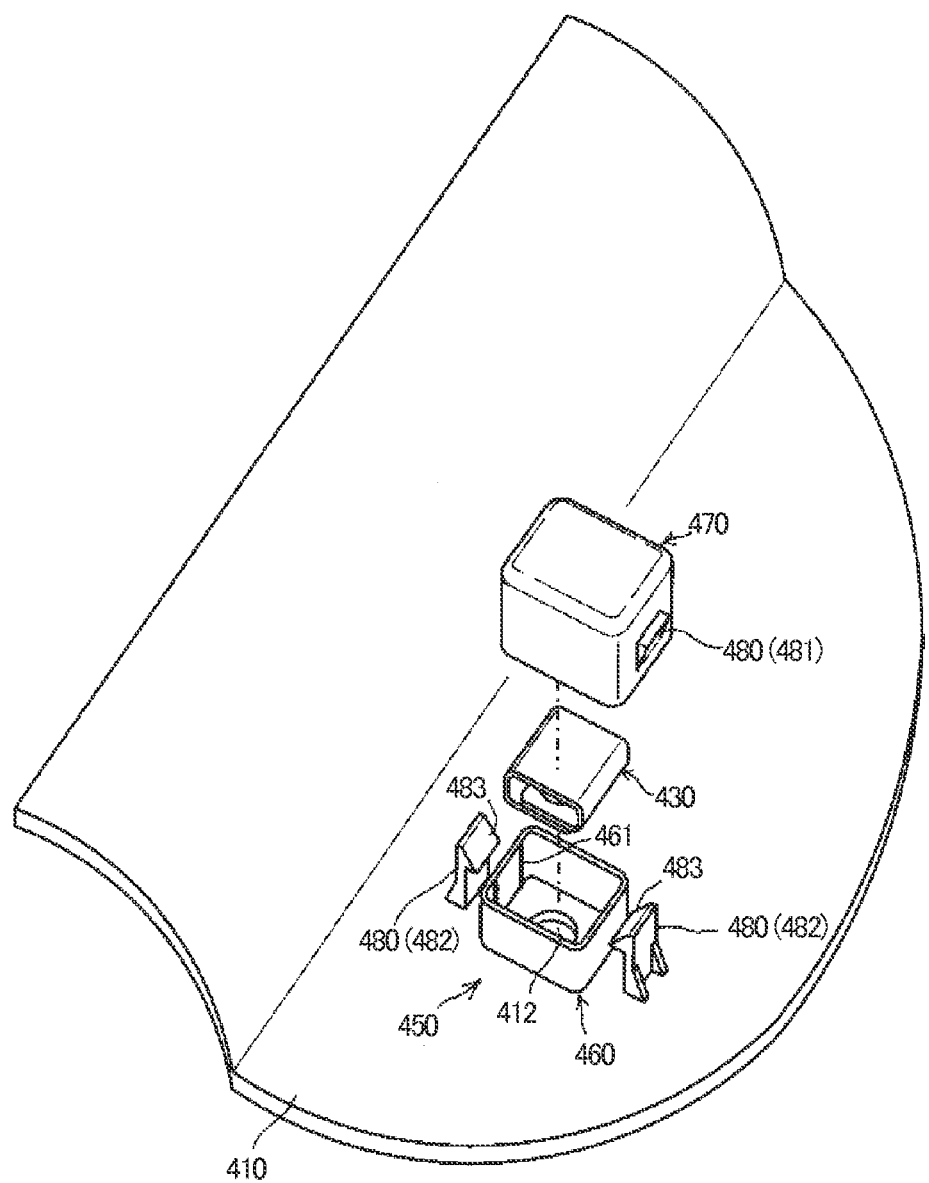
FIG. 29 is an exploded perspective view of an attachment structure of the television receiver illustrated in FIG. 23, showing an arrangement of the attachment structure inside a back panel of the television receiver.

FIG. 29 is an exploded perspective view of the attachment structure, showing an arrangement of the attachment structure inside of the back panel 410. A fixing means or structure 450 is provided to attach the attachment fixture 430 to the inside of the back panel 410. The fixing structure 450 has an attachment fixture accommodating frame 460, a cap body 470 which is an electrically insulating resin molding, an engaging means or structure 480, and an elastic urging means or structure 490 (see FIG. 32).

As shown in FIG. 29, the attachment fixture accommodating frame 460 is a rectangular ring-shaped frame provided so as to protrude toward the back from the back panel 410 in a position surrounding the through-holes 412 of the back panel 410. The attachment fixture accommodating frame 460 is molded of resin integrally with the back panel 410.

Figure 30:
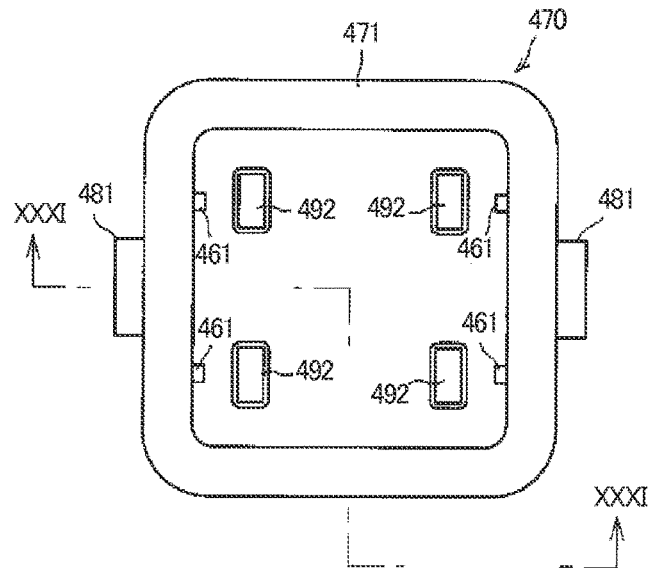
FIG. 30 is a top plan view of a cap body of the attachment structure illustrated in FIG. 29, showing an internal configuration of the cap body.
Figure 31:
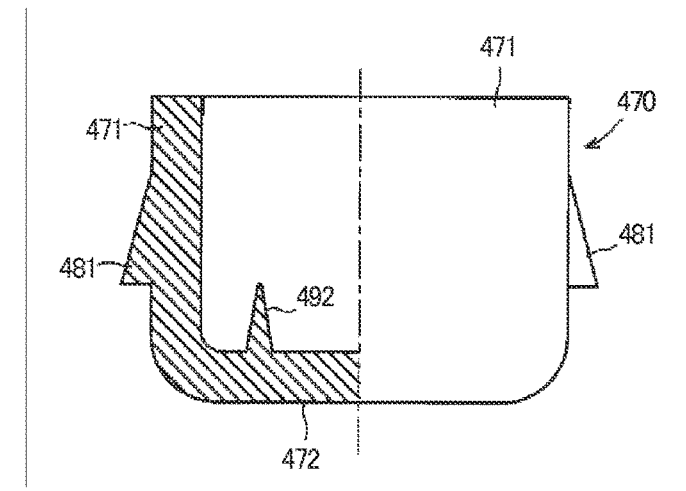
FIG. 31 is a side elevational view of the cap body illustrated in FIG. 30, with a partial cross sectional view of the cap body taken along XXXI-XXXI line in FIG. 30.
Figure 32:
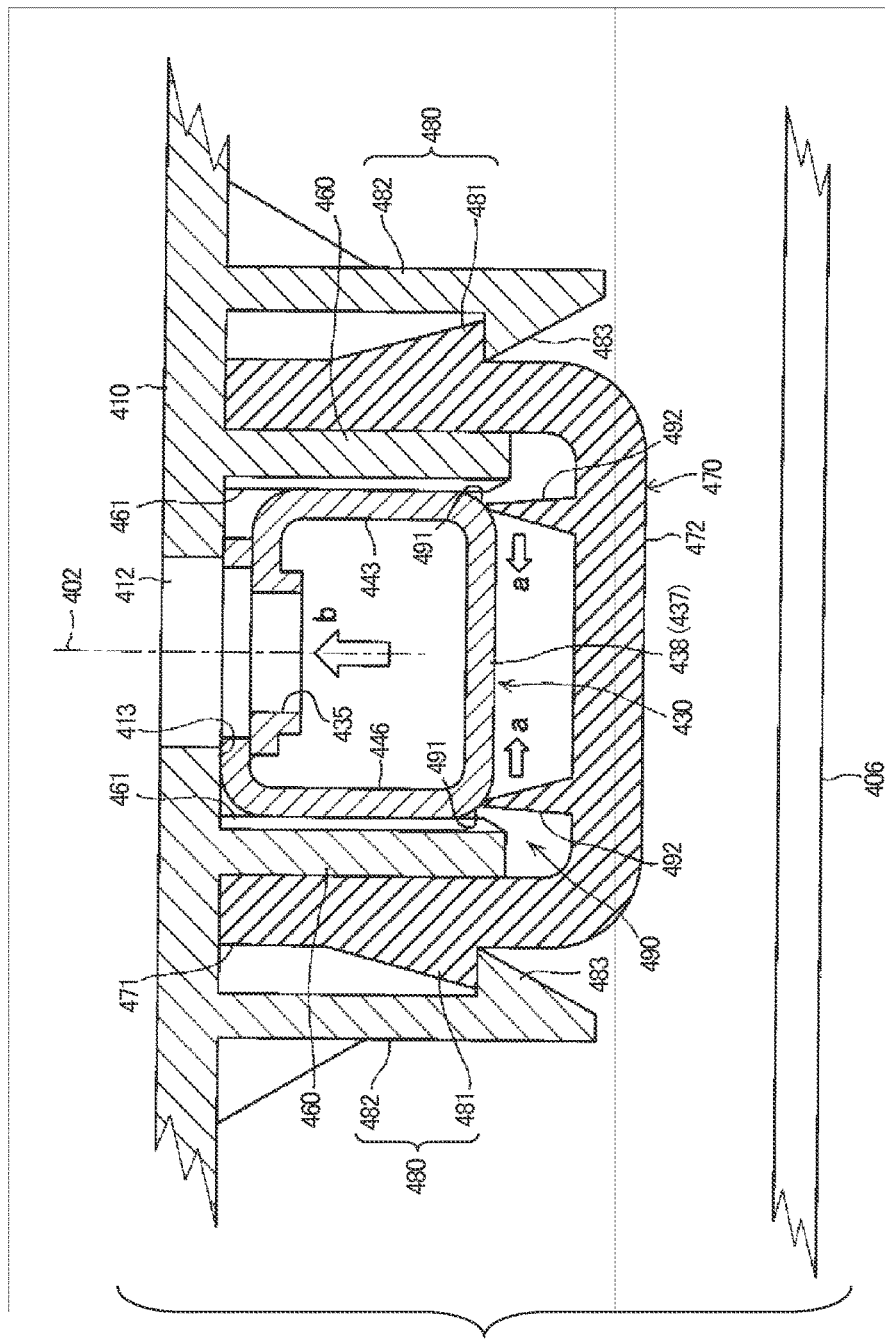
FIG. 32 is a cross sectional view of the attachment structure illustrated in FIG. 29.

FIG. 30 is a top plan view of the cap body 470 showing an internal configuration of the cap body 470, FIG. 31 is a side elevational view of the cap body 470, with a partial cross sectional view of the cup body taken along line XXXI-XXXI line in FIG. 30. FIG. 32 is a cross-sectional view of the attachment structure for attaching the attachment fixture 430.

As shown in FIG. 32, the attachment fixture 430 is inserted into and accommodated in the attachment fixture accommodating frame 460. In this accommodated state, the attachment fixture 430 is sandwiched in two orthogonal axes by the attachment fixture accommodating frame 460 and positioned in a direction along a flat inside surface of the back panel 410. In order to achieve more reliable positioning of the attachment fixture 430 by the attachment fixture accommodating frame 460 in the present embodiment, ribs 461 are provided to a pair of flat mutually opposing inside surfaces of the attachment fixture accommodating frame 460. The ribs 461 make contact with the side plate part 443 on one side and the side plate part 446 on the other side, respectively.

As shown in FIGS. 30 and 31, the cap body 470 has a rectangular ring-shaped peripheral wall 471 and a top wall 472 which is provided at one end part of the peripheral wall. As shown in FIG. 32, the cap body 470 is fitted on the outside of the attachment fixture accommodating frame 460 without significant looseness. When the cap body 470 is fitted on the outside of the attachment fixture accommodating frame 460 in this manner, the attachment fixture 430 accommodated in the attachment fixture accommodating frame 460 is covered by the cap body 470.

The engaging structure 480 is used to connect the cap body 470 to the back panel 410. As shown in FIGS. 29, 30 and 31, the engaging structure 480 includes a pair of engaging claws 481 and a pair of hooks 482. The engaging claws 481 are provided opposite each other on side surfaces of the peripheral wall 471 of the cap body 470. The hooks 482 protrude integrally from the back panel 410. The hooks 482 are each provided with a claw part 483 for engaging with the respective engaging claw 481. When the cap body 470 is fitted in the attachment fixture accommodating frame 460 in the manner described above, as fitting takes place, the engaging claws 481 engage on the claw parts 483 as shown in FIG. 32 after surmounting the claw parts 483 while elastically deforming the hooks 482. Consequently, the cap body 470 is fixed to the back panel 410 in the manner shown in FIG. 32 by the action of the engaging structure 480.

The elastic urging structure 490 will next be described. The elastic urging structure 490 is interposed between the cap body 470 and the attachment fixture 430, and serves to elastically urge and press the attachment fixture 430 against a receiving surface 413 (see FIG. 32) provided to the back panel 410.

As shown in FIG. 32, the elastic urging structure 490 is formed by a pair of inclined surfaces 491 and a pair of tab-shaped resin spring parts 492. The inclined surfaces 491 are provided to the attachment fixture 430 and inclined so that the space therebetween widens toward the back panel 410. The spring parts 492 elastically contact with the inclined surfaces 491, respectively. The resin spring parts 492 are molded integrally with the cap body 470. In this embodiment, a pair of arc-shaped curved surfaces (see FIG. 27) which form the outside surfaces of the folded parts 441 and 444 at the longitudinal ends of the plate-shaped part 437 of the attachment fixture 430 is used as the inclined surfaces 491. As shown in FIGS. 30 and 31, two pairs of resin spring parts 492 are provided to the cap body 470. When the two pairs of resin spring parts 492 on the cap body 470 side elastically contact with the inclined surfaces 491 on the attachment fixture 430 side, the resin spring parts 492 are pushed against the inclined surfaces 491 and deformed outward. Furthermore, the inclined surfaces 491 are pressed inward as indicated by the arrows a in FIG. 32 by the return force of the resin spring parts 492. As a result, a force is generated that pushes the attachment fixture 430 toward the receiving surface 413 of the back panel 410 in the direction of the arrow b in FIG. 32. Thus, a state occurs in which the attachment fixture 430 is continually pressed against the receiving surface 413 of the back panel 410.

In the attachment structure shown in FIG. 32, a wiring board 406 for controlling a liquid crystal display module is disposed in the vicinity of the location in which the attachment fixture 430 is attached. However, the screwing depth of the machine screw 402 (see FIG. 28) inserted in the through-hole 412 of the back panel 410 and the machine screw insertion hole 436 provided to the overlapping part 434 of the attachment fixture 430 and screwed into the threaded hole 435 is restricted by the abutting of the distal end part 404 of the machine screw 402 against the receiving part 438. Therefore, even when a long machine screw 402 is misapplied and screwed in, there is no possibility of the distal end part 404 of the machine screw 402 contacting the wiring board 406 or an electrical/electronic component mounted thereto. In the case that the machine screw 402 has an appropriate axial length, there is no possibility of the distal end part of the machine screw 402 abutting the receiving part 438 by being screwed in too far.

As described with reference to FIG. 28, even when the distal end part 404 of the misapplied machine screw 402 abuts the receiving part 438, there is no possibility of the attachment fixture 430 becoming deformed as a result.

Through the attachment structure for the attachment fixture 430 shown in FIG. 32, the attachment fixture 430 is sandwiched in two orthogonal axes by the attachment fixture accommodating frame 460 and positioned in a direction along a flat inside surface of the back panel 410. Furthermore, a state occurs in which the attachment fixture 430 is continually pressed against the receiving surface 413 of the back panel 410 by the action of the elastic urging structure 490. The attachment fixture 430 is therefore less prone to generate a rattling sound due to vibration caused by loudness or other effects of the speakers of the television receiver 400. Since the metal attachment fixture 430 is covered by the cap body 470 formed of an electrically insulating resin molding, even when static electricity transfers from a through-hole 412 of the back panel 410 to charge the attachment fixture 430, the static electricity is blocked by the cap body 470. Thus, there is no risk of the static electricity causing a control circuit of the wiring board 406 to malfunction.

In the fourth embodiment, the attachment structure for the attachment fixture 430 is explained as having a configuration shown in FIG. 32. However, a configuration can be adopted in which another structure, e.g., a screw fitting or other means, is used to attach the attachment fixture 430 to the back panel 410.

The connecting device in accordance with the fourth embodiment has the machine screw 402 and the attachment fixture 430. The attachment fixture 430 has the threaded hole 435 and the receiving part 438. The machine screw 402 is screwed into the threaded hole 435. The receiving part 438 stops the distal end part 404 of the machine screw 402 screwed into the threaded hole 435 and prevents the machine screw 402 from screwing in too far.

In the attachment fixture 430, the attachment fixture body 431 is formed by folding a band-shaped sheet-metal member in a plurality of locations in the longitudinal direction thereof. The attachment fixture body 431 has the overlapping part 434 and the plate-shaped part 437. At the overlapping part 434, the inside piece 432 at one end of the sheet-metal member and the outside piece 433 at the other end thereof in the longitudinal direction overlap each other. The plate-shaped part 437 faces the overlapping part 434. The threaded hole 435 is formed passing through the inside piece 432 at one end of the sheet-metal member disposed on an inside of the overlapping part 434. The machine screw insertion hole 436 in which the machine screw 402 is inserted is formed in the outside piece 433 at the other end of the sheet-metal member disposed on an outside of the overlapping part 434. The receiving part 438 is formed by the plate-shaped part 437.

In this configuration, the attachment fixture body 431 is formed by folding a band-shaped sheet-metal member in a plurality of locations in the longitudinal direction thereof. The threaded hole 435 and the machine screw insertion hole 436 are formed in the inside and outside pieces 432 and 433 at one end and the other end of the sheet-metal member, respectively. The inside and outside pieces 432 and 433 are disposed on the inside and outside of the overlapping part 434, respectively. There is therefore no need to perform deep-drawing to form the threaded hole. Regardless of this fact, the receiving part 438 for stopping the distal end part 404 of the machine screw 402 screwed into the threaded hole 435 and preventing the machine screw 402 from screwing in too far is formed by the plate-shaped part 437 of the attachment fixture body 431. Thus, there is no room for the distal end part 404 of the machine screw 402 to contact the wiring board 406 or other energized part when screwed in too far as a result of misapplication of the machine screw 402.

Fabrication of the attachment fixture 430 does not include a deep-drawing process and can be performed merely by a simple process of bending, hole drilling, screw thread cutting, or the like, and can therefore be inexpensively performed. Reduction in defect rates is also promoted. Furthermore, since there is no need to consider material flow such as occurs in deep-drawing, size reduction is readily promoted.

In the fourth embodiment, the attachment fixture body 431 has the inside and outside pieces 432 and 433 at one end and the other end in the longitudinal direction of the sheet-metal member forming the overlapping part 434. The attachment fixture body 431 also has the plate-shaped part 437 for forming the receiving part 438. The attachment fixture body 431 also has the side plate part 443 on one side connectedly provided to one end part in the longitudinal direction of the plate-shaped part 437 and to the inside piece 432 at one end so as to extend therebetween via the folded parts 441 and 442. The attachment fixture body 431 also has the side plate part 446 on the other side connectedly provided to the other end part in the longitudinal direction of the plate-shaped part 437 and to the outside piece 433 at the other end so as to extend therebetween via the folded parts 444 and 445. The shape in side view of the attachment fixture body 431 is a substantially rectangular ring shape. When this configuration is adopted, a condition occurs in which the distal end part 404 of the misapplied machine screw 402 comes in contact with the receiving part 438 formed by the plate-shaped part 437 and strongly pushes against the receiving part 438. Even when the inside and outside pieces 432 and 433 at one end and the other end of the overlapping part 434 are subjected to a load which acts to deform the inside and outside pieces 432 and 433 in the opening direction thereof, the machine screw 402 inserted in the machine screw insertion hole 436 in the outside piece 433 at the other end is screwed into the threaded hole 435 in the inside piece 432 at the one end. Thus, an effect is demonstrated whereby the inside and outside pieces 432 and 433 at one end and the other end of the overlapping part 434 are prevented from deforming open by the machine screw 402.

In the fourth embodiment, the attachment fixture 430 is attached to an inside of the back panel 410 of the television receiver 400. The threaded hole 435 and the machine screw insertion hole 436 of the attachment fixture 430 face the through-hole 412 provided to the back panel 410. The machine screw 402 inserted in the through-hole 412 and the machine screw insertion hole 436 and screwed into the threaded hole 435 is a machine screw for fixing a wall-mount fitting, used to fix the television receiver 400 to a wall surface, to the back panel 410. Through this configuration, the television receiver 400 can be used in a wall-mounted configuration. Even when the wiring board 406 for control of a display module (liquid crystal display module or the like) of the television receiver 400 is disposed in the vicinity of the location in which the attachment fixture 430 is attached, and a long machine screw 402 is misapplied as the machine screw for fixing the wall-mount fitting to the back panel 410, there is no longer a risk of the distal end part 404 of the machine screw 402 contacting the wiring board 406 for control, an electrical/electronic component mounted to the wiring board 406, or another energized part and causing an unexpected malfunction or accident. Since effects are demonstrated whereby the misapplied long machine screw 402 is prevented from causing opening deformation of the inside and outside pieces 432 and 433 at one end and the other end of the overlapping part 434 of the attachment fixture 430, the television receiver 400 mounted on the wall surface is no longer tilted or otherwise affected by deformation of the attachment fixture 430.

The connecting device in accordance with the fourth embodiment can be used not only when the television receiver 400 is used in a wall-mounted configuration, but in other applications as well. For example, the present disclosure can be applied in the same manner when a portable-type television receiver, a photo frame, a speaker, or the like is used in a wall-mounted configuration. The present disclosure can also be used as an antenna fixing part for fixing an antenna to the chassis of an audio-visual (AV) instrument or the like.

In the fourth embodiment, as described above, the connecting device has the machine screw 402 and the attachment fixture 430 having the threaded hole 435 into which the machine screw 402 is screwed and the receiving part 438 for preventing the machine screw 402 from screwing in too far. The attachment fixture 430 can be fabricated merely by a process of bending, hole drilling, screw thread cutting, or the like from a band-shaped sheet-metal member. This configuration produces effects whereby not only can the connecting device be fabricated at low cost and more easily than by deep-drawing or the like, but reduction in size and reduction of the product defect rate are also promoted. There is also no opportunity for malfunctioning or accidents due to contacting of wiring boards or other energized parts by the distal end part 404 of the misapplied machine screw 402 when the machine screw 402 is screwed in too far.

The effects described above are also demonstrated as such when the connecting device of the present disclosure is employed for using the television receiver 400 in the wall-mounted configuration.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A display device comprising:
   a chassis made of electrically insulating material;
   a fastening member; and
   a cap member made of electrically insulating material, and including an inner side surface that defines a cavity,
   the chassis including a housing side wall that extends in a first direction perpendicular to an inside surface of the chassis and has an inner side surface and an outer side surface that face away relative to each other in a second direction intersecting with the first direction, the inner side surface of the housing side wall defining an interior housing space in which the fastening member is disposed, and
   the cap member being attached to the chassis to cover the housing side wall and the fastening member, the inner side surface of the cap member at least partially facing with the outer side surface of the housing side wall in the second direction.

2. The display device according to claim 1, further comprising
   a screw extending through a through-hole of the chassis and screwed into a threaded hole of the fastening member,
   the fastening member being disposed inside the chassis, and
   the cap member retaining the fastening member relative to the chassis, the cap member having a first engaging part that engages with an internal portion of the chassis.

3. The display device according to claim 1, wherein
   the chassis is made of resin.

4. The display device according to claim 2, wherein
   the internal portion of the chassis has a second engaging part that engages with the first engaging part of the cap member.

5. The display device according to claim 2, wherein
   the internal portion of the chassis has a positioning part that aligns the threaded hole of the fastening member relative to the through-hole of the chassis.

6. The display device according to claim 5, wherein
   the housing side wall of the chassis is frame-shaped and includes the positioning part, the housing side wall surrounding an external periphery of the fastening member.

7. The display device according to claim 2, wherein
   the fastening member further includes a screw receiving part that receives a distal end of the screw.

8. The display device according to claim 7, wherein
   the fastening member further includes an overlapping part that is formed by folding a sheet-shaped metal member and superposes both ends thereof on each other, and a facing part that faces the overlapping part,
   the overlapping part having the threaded hole of the fastening member, and the facing part forming the screw receiving part of the fastening member.

9. The display device according to claim 2, wherein
   the cap member further includes an urging part that urges the fastening member toward the inside surface of the chassis.

10. The display device according to claim 9, wherein
    the urging part includes a deformable protrusion that is formed integrally with the cap member between the cap member and the fastening member.

11. The display device according to claim 10, wherein
    the fastening member further has a pair of inclined parts that is inclined with a gap therebetween enlarging toward the inside surface of the chassis, and
    the urging part further includes an additional deformable protrusion, the deformable protrusion and the additional deformable protrusion contacting with the inclined parts, respectively.

12. The display device according to claim 4, wherein
the first engaging part of the cap member includes a first engaging piece that protrudes in a direction along the inside surface of the chassis,
the second engaging part of the chassis includes a second engaging piece that stands from the inside surface of the chassis and extends in the direction along the inside surface of the chassis, and
the first engaging part is engaged with the second engaging part in a direction orthogonal to the inside surface of the chassis by moving the cap member in the direction along the inside surface of the chassis.

13. The display device according to claim 12, wherein
at least one of the chassis and the cap member has a restricting part that restricts movement of the cap member in the direction along the inside surface of the chassis while the first engaging piece of the first engaging part and the second engaging piece of the second engaging part are engaged.

14. A display device comprising:
a display unit;
a chassis made of electrically insulating material;
a fastening member made of metal;
an attachment member covering the fastening member, the attachment member being made of an electrically insulating resin material, the attachment member including a cavity; and
a screw extending through a through-hole of the chassis and screwed into a threaded hole of the fastening member,
the chassis including a housing wall part that extends inside the chassis from an inside surface of the chassis and at least partially surrounds the fastening member,
an inner wall surface of the cavity of the attachment member at least partially surrounding an external periphery of the housing wall part,
the fastening member being disposed inside the chassis,
the attachment member retaining the fastening member relative to the chassis, the attachment member having a first engaging part that engages with an internal portion of the chassis.

15. The display device according to claim 14, wherein
the attachment member has a cap shaped portion, the cap shaped portion including a side wall part that surrounds the fastening member from sides thereof, and a lid part that covers the side wall part.

16. A display device comprising:
a chassis made of electrically insulating material;
a fastening member;
a cap member made of electrically insulating material, and including an inner side surface that defines a cavity; and
a screw extending through a through-hole of the chassis and screwed into a threaded hole of the fastening member,
the chassis including a housing side wall that extends in a first direction perpendicular to an inside surface of the chassis and has an inner side surface and an outer side surface that face away relative to each other in a second direction intersecting with the first direction, the inner side surface of the housing side wall defining an interior housing space in which the fastening member is disposed,
the cap member being attached to the chassis to cover the housing side wall and the fastening member, the inner side surface of the cap member at least partially facing with the outer side surface of the housing side wall in the second direction,
the fastening member being disposed inside the chassis,
the cap member retaining the fastening member relative to the chassis, the cap member having a first engaging part that engages with an internal portion of the chassis,
the internal portion of the chassis has a second engaging part that engages with the first engaging part of the cap member,
the second engaging part of the chassis including a hook part that outwardly protrudes with respect to the through-hole, and
the first engaging part of the cap member including an engaging concavity, the engaging concavity engaging with the hook part from outside of the hook part.

17. The display device according to claim 16, wherein
the first engaging part of the cap member has higher flexibility than the second engaging part of the chassis, and
the hook part of the second engaging part and the engaging concavity of the first engaging part are engaged by flexing the first engaging part.

18. The display device according to claim 17, wherein
the cap member includes a lid part that faces the inside surface of the chassis, and a side wall part that extends toward the inside surface of the chassis from a peripheral edge of the lid part, and
the first engaging part of the cap member outwardly extends from the peripheral edge of the lid part, the engaging concavity engaging with the hook part on an outside of the side wall part.

* * * * *